(12) United States Patent
Wysocki et al.

(10) Patent No.: US 7,956,272 B2
(45) Date of Patent: Jun. 7, 2011

(54) MANAGEMENT OF FILES IN A PERSONAL COMMUNICATION DEVICE

(75) Inventors: Christopher R. Wysocki, Los Gatos, CA (US); Timothy Wasko, High River (CA); Jeffrey L. Robbin, Los Altos, CA (US); Steve Jobs, Palo Alto, CA (US); Greg Christie, San Jose, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 784 days.

(21) Appl. No.: 11/295,694

(22) Filed: Dec. 5, 2005

(65) Prior Publication Data

US 2007/0038941 A1 Feb. 15, 2007

Related U.S. Application Data

(63) Continuation of application No. 11/221,368, filed on Sep. 6, 2005, now abandoned, which is a continuation-in-part of application No. 10/282,861, filed on Oct. 28, 2002, now Pat. No. 7,166,791.

(60) Provisional application No. 60/399,806, filed on Jul. 30, 2002, provisional application No. 60/714,537, filed on Sep. 2, 2005.

(51) Int. Cl.
*G09B 15/00* (2006.01)
*G09B 15/02* (2006.01)
*G10H 1/00* (2006.01)

(52) U.S. Cl. ............................ 84/477 R; 84/615; 84/653
(58) Field of Classification Search ........................ None
See application file for complete search history.

(56) References Cited

U.S. PATENT DOCUMENTS

| | | | |
|---|---|---|---|
| 5,559,945 A | 9/1996 | Beaudet et al. | |
| 5,583,993 A | 12/1996 | Foster et al. | |
| 5,587,404 A | 12/1996 | Kroner et al. | |
| 5,616,876 A | 4/1997 | Cluts | |
| 5,627,531 A | 5/1997 | Posso et al. | |
| 5,640,566 A | 6/1997 | Victor et al. | |
| 5,666,530 A | 9/1997 | Clark et al. | |
| 5,710,922 A | 1/1998 | Alley et al. | |
| 5,721,949 A | 2/1998 | Smith et al. | |
| 5,727,202 A | 3/1998 | Kucala | |
| 5,739,451 A | 4/1998 | Winksy et al. | |
| 5,835,721 A | 11/1998 | Donahue et al. | |
| 5,835,732 A | 11/1998 | Kikinis et al. | |
| 5,845,282 A | 12/1998 | Alley et al. | |
| 5,864,868 A | 1/1999 | Contois | |

(Continued)

FOREIGN PATENT DOCUMENTS

EP 0 917 077 5/1999

(Continued)

OTHER PUBLICATIONS

"ICRealtime DVR" User's manual—Apr. 12, 2001.*

(Continued)

*Primary Examiner* — Marlon T Fletcher
(74) *Attorney, Agent, or Firm* — Morrison & Foerster LLP

(57) ABSTRACT

Improved approaches for assisting a user interacting with a portable wireless communication device are disclosed. The improved approaches can provide a user interface for the portable wireless communication device that includes including a plurality of linked display screens and a plurality of physical keys.

32 Claims, 78 Drawing Sheets

U.S. PATENT DOCUMENTS

| | | | |
|---|---|---|---|
| 5,918,213 | A | 6/1999 | Bernard et al. |
| 5,918,303 | A * | 6/1999 | Yamaura et al. ............... 84/609 |
| 5,923,757 | A | 7/1999 | Hocker et al. |
| 5,925,843 | A | 7/1999 | Miller et al. |
| 5,963,916 | A | 10/1999 | Kaplan |
| 5,964,821 | A | 10/1999 | Brunts et al. |
| 5,969,283 | A | 10/1999 | Looney et al. |
| 6,000,000 | A | 12/1999 | Hawkins et al. |
| 6,006,274 | A | 12/1999 | Hawkins et al. |
| 6,038,199 | A | 3/2000 | Pawlowski et al. |
| 6,041,023 | A | 3/2000 | Lakhansingh |
| 6,061,306 | A | 5/2000 | Buchheim |
| 6,125,369 | A | 9/2000 | Wu et al. |
| 6,172,948 | B1 | 1/2001 | Keller et al. |
| 6,208,044 | B1 | 3/2001 | Viswanadham et al. |
| 6,216,131 | B1 | 4/2001 | Liu et al. |
| 6,243,328 | B1 | 6/2001 | Fenner et al. |
| 6,243,725 | B1 | 6/2001 | Hempleman et al. |
| 6,247,135 | B1 | 6/2001 | Feague |
| 6,248,496 | B1 * | 6/2001 | Galloway et al. ........ 430/111.35 |
| 6,248,946 | B1 | 6/2001 | Dwek |
| 6,272,545 | B1 | 8/2001 | Flanagin et al. |
| 6,283,764 | B2 | 9/2001 | Kajiyama et al. |
| 6,295,541 | B1 | 9/2001 | Bodnar et al. |
| 6,332,175 | B1 | 12/2001 | Birrell et al. |
| 6,338,044 | B1 | 1/2002 | Cook et al. |
| 6,340,800 | B1 | 1/2002 | Zhai et al. |
| 6,341,316 | B1 | 1/2002 | Kloba et al. |
| 6,356,971 | B1 | 3/2002 | Katz et al. |
| 6,380,947 | B1 | 4/2002 | Stead |
| 6,389,467 | B1 | 5/2002 | Eyal |
| 6,453,281 | B1 | 9/2002 | Walters et al. |
| 6,490,432 | B1 | 12/2002 | Wegener et al. |
| 6,493,758 | B1 | 12/2002 | McLain |
| 6,523,124 | B1 | 2/2003 | Lunsford et al. |
| 6,529,804 | B1 | 3/2003 | Draggon et al. |
| 6,563,769 | B1 | 5/2003 | Van Der Meulen |
| 6,587,403 | B1 | 7/2003 | Keller et al. |
| 6,587,404 | B1 | 7/2003 | Keller et al. |
| 6,593,914 | B1 | 7/2003 | Nuovo et al. |
| 6,621,768 | B1 | 9/2003 | Keller et al. |
| 6,636,197 | B1 | 10/2003 | Goldenberg et al. |
| 6,636,873 | B1 | 10/2003 | Carini et al. |
| 6,664,981 | B2 | 12/2003 | Ashe et al. |
| 6,665,803 | B2 | 12/2003 | Lunsford et al. |
| 6,683,653 | B1 | 1/2004 | Miyake et al. |
| 6,718,348 | B1 | 4/2004 | Novak et al. |
| 6,721,489 | B1 | 4/2004 | Benyamin et al. |
| 6,731,312 | B2 | 5/2004 | Robbin |
| 6,760,721 | B1 | 7/2004 | Chasen et al. |
| 6,763,345 | B1 | 7/2004 | Hempleman et al. |
| 6,779,019 | B1 | 8/2004 | Mousseau et al. |
| 6,785,542 | B1 | 8/2004 | Blight et al. |
| 6,794,566 | B2 | 9/2004 | Pachet |
| 6,801,964 | B1 | 10/2004 | Mahdavi |
| 6,874,037 | B1 | 3/2005 | Abram et al. |
| 6,925,595 | B1 | 8/2005 | Whitledge et al. |
| 6,928,433 | B2 * | 8/2005 | Goodman et al. ............... 707/4 |
| 6,933,433 | B1 | 8/2005 | Porteus et al. |
| 6,941,324 | B2 | 9/2005 | Plastina et al. |
| 6,956,562 | B1 | 10/2005 | O'Hara et al. |
| 6,978,127 | B1 | 12/2005 | Bulthuis et al. |
| 6,987,221 | B2 | 1/2006 | Platt |
| 7,010,758 | B2 | 3/2006 | Bate |
| 7,022,905 | B1 * | 4/2006 | Hinman et al. ............... 84/609 |
| 7,039,656 | B1 | 5/2006 | Tsai et al. |
| 7,069,058 | B2 * | 6/2006 | Kawashima ............... 455/567 |
| 7,075,000 | B2 * | 7/2006 | Gang et al. ............... 84/600 |
| 7,111,009 | B1 | 9/2006 | Gupta |
| 7,136,934 | B2 | 11/2006 | Carter et al. |
| 7,295,983 | B2 * | 11/2007 | Fujiwara et al. ............ 704/270 |
| 7,560,637 | B1 | 7/2009 | Robbin et al. |
| 2001/0004310 | A1 | 6/2001 | Kono |
| 2001/0011308 | A1 | 8/2001 | Clark et al. |
| 2001/0018858 | A1 | 9/2001 | Dwek |
| 2001/0021053 | A1 | 9/2001 | Colbourne et al. |
| 2001/0041021 | A1 | 11/2001 | Boyle et al. |
| 2001/0044835 | A1 | 11/2001 | Schober et al. |
| 2001/0048642 | A1 | 12/2001 | Berhan |
| 2001/0052123 | A1 | 12/2001 | Kawai |
| 2002/0002413 | A1 | 1/2002 | Tokue |
| 2002/0013784 | A1 | 1/2002 | Swanson |
| 2002/0046315 | A1 | 4/2002 | Miller et al. |
| 2002/0055934 | A1 | 5/2002 | Lipscomb et al. |
| 2002/0073139 | A1 | 6/2002 | Hawkins et al. |
| 2002/0093490 | A1 | 7/2002 | Lee |
| 2002/0113824 | A1 | 8/2002 | Myers |
| 2002/0116082 | A1 | 8/2002 | Gudorf |
| 2002/0133515 | A1 | 9/2002 | Kagle et al. |
| 2002/0138606 | A1 | 9/2002 | Robison |
| 2002/0161865 | A1 | 10/2002 | Nguyen |
| 2002/0174269 | A1 | 11/2002 | Spurgat et al. |
| 2002/0180716 | A1 * | 12/2002 | Kim ............................ 345/204 |
| 2002/0194309 | A1 | 12/2002 | Carter et al. |
| 2003/0013493 | A1 | 1/2003 | Irimajiri et al. |
| 2003/0030733 | A1 | 2/2003 | Seaman et al. |
| 2003/0037254 | A1 | 2/2003 | Fischer et al. |
| 2003/0046434 | A1 | 3/2003 | Flanagin et al. |
| 2003/0050058 | A1 | 3/2003 | Walsh et al. |
| 2003/0065802 | A1 | 4/2003 | Vitikainen et al. |
| 2003/0074457 | A1 | 4/2003 | Kluth |
| 2003/0076301 | A1 | 4/2003 | Tsuk |
| 2003/0079038 | A1 | 4/2003 | Robbin et al. |
| 2003/0112279 | A1 | 6/2003 | Irimajiri |
| 2003/0167318 | A1 | 9/2003 | Robbin et al. |
| 2003/0182315 | A1 | 9/2003 | Plastina et al. |
| 2003/0191756 | A1 | 10/2003 | Oh |
| 2003/0210821 | A1 | 11/2003 | Yogeshwar et al. |
| 2003/0221541 | A1 * | 12/2003 | Platt ............................... 84/609 |
| 2004/0001395 | A1 | 1/2004 | Keller et al. |
| 2004/0001396 | A1 | 1/2004 | Keller et al. |
| 2004/0004338 | A1 | 1/2004 | Jung |
| 2004/0017997 | A1 | 1/2004 | Cowgill |
| 2004/0027930 | A1 | 2/2004 | Kudo |
| 2004/0055446 | A1 | 3/2004 | Robbin et al. |
| 2004/0076086 | A1 | 4/2004 | Keller et al. |
| 2004/0078416 | A1 | 4/2004 | Kawasaki et al. |
| 2004/0139180 | A1 | 7/2004 | White et al. |
| 2004/0139844 | A1 * | 7/2004 | Tsuboi ........................... 84/600 |
| 2004/0225762 | A1 | 11/2004 | Poo |
| 2004/0242224 | A1 | 12/2004 | Janik et al. |
| 2005/0080915 | A1 | 4/2005 | Shoemaker |
| 2005/0240494 | A1 | 10/2005 | Cue et al. |
| 2005/0240661 | A1 | 10/2005 | Heller et al. |
| 2005/0262528 | A1 | 11/2005 | Herley et al. |
| 2006/0027100 | A1 * | 2/2006 | Schultz ........................... 84/613 |
| 2006/0100978 | A1 | 5/2006 | Heller et al. |
| 2006/0159109 | A1 | 7/2006 | Lamkin et al. |
| 2006/0168340 | A1 | 7/2006 | Heller et al. |
| 2006/0168351 | A1 | 7/2006 | Ng |
| 2006/0282858 | A1 * | 12/2006 | Csicsatka et al. ............... 725/52 |
| 2007/0067309 | A1 | 3/2007 | Klein et al. |
| 2007/0073728 | A1 | 3/2007 | Klein et al. |
| 2007/0074118 | A1 | 3/2007 | Robbin et al. |
| 2007/0084333 | A1 | 4/2007 | Robbin et al. |
| 2007/0088727 | A1 | 4/2007 | Kindig |
| 2007/0124680 | A1 | 5/2007 | Robbin et al. |
| 2007/0220552 | A1 | 9/2007 | Juster et al. |
| 2008/0086494 | A1 | 4/2008 | Heller et al. |
| 2009/0241070 | A1 | 9/2009 | Robbin et al. |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2001-117800 | 4/2001 |
| JP | 2001-93226 | 6/2001 |
| WO | WO 95/16950 | 6/1995 |
| WO | WO 01/33569 | 5/2001 |
| WO | WO 01/67753 | 9/2001 |
| WO | 02/25610 | 3/2002 |
| WO | WO 02/25935 | 3/2002 |
| WO | WO 03/023786 | 3/2003 |
| WO | WO 03/036541 | 5/2003 |
| WO | WO 2004/004338 | 1/2004 |
| WO | 2004/084413 | 9/2004 |

OTHER PUBLICATIONS

"DVR won't fast forward to end of recorded program"—Transcript regarding playback operation (verizon—forum)—Aug. 10, 2010.*

Adam C. Engst, "SoundJam Keeps on Jammin'," Jun. 19, 2000, http://db.tidbits.com/getbits.acgi?tbart=05988.

Andrew Birrell, "Personal Jukebox (PJB)," Oct. 13, 2000, http://birrell.org/andrew/talks/pjb-overview.ppt.

"Apple Announces iTunes 2," Press Release, Apple Computer, Inc., Oct. 23, 2001.

"Apple's iPod Available in Stores Tomorrow," Press Release, Apple Computer, Inc. Nov. 9, 2001.

"Apple Introduces iTunes—World's Best and Easiest To Use Jukebox Software," Macworld Expo, San Francisco, Jan. 9, 2001.

Compaq, "Personal Jukebox," Jan. 24, 2001, http://research.compaq.com/SRC/pjb/.

De Herrera, Chris, "Microsoft ActiveSync 3.1," Version 1.02, Oct. 13, 2000.

Glenn Fleishman, "Handheld iPod joins MP3 band a bit late, but is standout player," Nov. 6, 2001, http://seattletimes.nwsource.com/html/businesstechnology/134361811_ptmacc040.html.

"Hewlett Packard Jornada 525 Color Pocket PC," downloaded Jan. 25, 2002, http://www.pc4d.com/electronics/products/56/jornada_525_color_pocket_pc.shtml.

IEEE 1394—Wikipedia, 1995, http://www.wikipedia.org/wiki/Firewire.

International Search Report for PCT/US 02/33332 dated Mar. 10, 2003.

iTunes, Digital Music for your Mac, Apple Computer, Inc., downloaded Oct. 22, 2001, http://www.apple.com/itunes/.

iTunes, Playlist Related Help Screens, iTunes v1.0, Apple Computer, Inc., Jan. 2001.

iTunes 2, Playlist Related Help Screens, iTunes v2.0, Apple Computer, Inc., Oct. 23, 2001.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

"Nomad Jukebox," User Guide, Creative Technology Ltd., Version 1, Aug. 2000.

Personal Jukebox (PJB), "Systems Research Center and PAAD," Compaq Computer Corp., Oct. 13, 2000, http://research.compaq.com/SRC/pjb/.

Replay Gain, "Replay Gain—A proposed Standard," Oct. 7, 2001, available from http://replaygain.hydrogenaudio.org/index.html and http://replaygain.hydrogenaudio.org/outline.html.

"Rio Portable Music Player," Web Review, downloaded Jan. 25, 2002, http://www.webreviews.com/9901/rio.html.

SoundJam MP Plus, Representative Screens, published by Casady & Greene, Inc., Salinas, CA, 2000.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

Specification Sheet, iTunes 2, Apple Computer, Inc., Oct. 31, 2001.

Steinberg, "Sonicblue Rio Car," Product Review, Dec. 12, 2000, http://electronics.cnet.com/electronics/0-6342420-1304-4098389.html.

Travis Butler, "Portable MP3: The Nomad Jukebox," Jan. 8, 2001, http://db.tidbits.com/getbits.acgi?tbart=06261.

Travis Butler, "Archos Jukebox 6000 Challenges Nomad Jukebox," Aug. 13, 2001, http://db.tidbits.com/getbits.acgi?tbart=06521.

Andy Lindauer, "What's in your Pocket?," Edgereview, downloaded Jan. 25, 2002, http://www.edgereview.com/print.cfm?Type=aag&ID=286.

Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.

Vetro et al., "Media Conversions to Support Mobile Users," IEEE Canadian Conference on Electrical and Computer Engineering, Piscataway, NJ, May 13, 2001, pp. 607-612.

Zheng et al., "MobiGATE: a mobile gateway proxy for the active deployment of transport entities," Proceedings of the 2004 International Conference on Parallel Processing, Piscataway, NJ, Aug. 15, 2004.

Compaq Computer Corp., copyright 1991, Personal Jukebox User Manual, pp. 1-29.

RealJukebox Plus Manual, Real Networks, Inc., copyright 1999, pp. 1-83, RealJukebox, Real Networks, Inc., .webpages downloaded Oct. 27, 2005 http://www.real.com/Jukebox/release_notes.html#.

TuneBase 100 User Guide, A CD Library Management System, Escient, Inc. copyright 1999.

Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.

Bridgman, "Windows XP Expert Zone Community Columist", Using Windows Mobil-based Portable Media Centers and Windows Media Player 10, Aug. 25, 2004, 1-11.

Etchison, "Accelerated Discrete Adjustment of the Parameters of a Process", IBM Technical Disclosure Bulletin, vol. 15, No. 5, Oct. 1, 1972, 2 pgs.

International Search Report for PCT/US2006/03411, Jun. 20, 2007, 4 pgs.

Written Opinion of International Searching Authority for PCT/US2006/034111, Jun. 20, 2007, 7 pgs.

U.S. Appl. No. 11/238,587, entitled "Graphical user interface and methods of use thereof in a multimedia player", filed Sep. 28, 2005.

U.S. Appl. No. 11/186,145, entitled "Graphical user interface and methods of use thereof in a multimedia player", filed Jul. 20, 2005.

U.S. Appl. No. 11/757,214, entitled "Intelligent synchronization of media player with host computer", filed Jun. 1, 2007.

U.S. Appl. No. 11/757,204, entitled "Intelligent synchronization of media player with host computer", filed Jun. 1, 2007.

U.S. Appl. No. 11/830,645, entitled "Multiple media type synchronization between host computer and media device", filed Jul. 30, 2007.

U.S. Appl. No. 11/679,082, entitled "Data SynchronizatIon with Host Device in Accordance with Synchronization Preferences", filed Feb. 26, 2007.

U.S. Appl. No. 11/238,587, entitled "Graphical user interface and methods of use thereof in a multimedia player", filed Sep. 28, 2005.

U.S. Appl. No. 11/679,114, entitled "Data Backup for Mobile Device", filed Feb. 26, 2007.

U.S. Appl. No. 10/936,233, entitled "Method and system for dynamically populating groups in a developer environment", filed Sep. 7, 2004.

U.S. Appl. No. 11/679,091, entitled "Background Data Transmission between Media Device and Host Device", filed Feb. 26, 2007.

U.S. Appl. No. 11/767,443, entitled "Widget Synchronization in Accordance with Synchronization Preferences", filed Jun. 22, 2007.

Iriver, "PMP140/120", Sep. 13, 2004, 1-2 pgs.

MG-25, Portable MPEG4 Player (MG-25), Jul. 29, 2004, 1-3 pgs.

Wikipedia: "iTunes", www.wikipedia.com, May 9, 2005, 6 pages.

Nutzel et al., "Sharing Systems for Future HiFi Systems", Proceedings of the Fourth International Conference on Web Delivering of Music, Sep. 13, 2008, 8 pgs.

"Diamond Multimedia Announces Rio PMP300 Portable MP3 Music Player", Press Release, http://news.harmony-central.com/Newp/1998/Rio-PMP300.html, Sep. 14, 1998, 4 pgs.

"Digital Still Cameras—Downloading Images to a Computer," Mimi Chakarova et al., Multi-Media Reporting and Convergence, Jan. 18, 2006, 2 pgs.

Handbook for Palm™ m500 Series Handhelds, User Manual, copyright 1998-2001.

RCA Lyra User's Guide, RD2201/2202/2204, www.lyrazone.com, pp. 1-37, (1999).

Lyra, Personal Digital Player, RCA, Product Box. (2003).

"About MusicMatch Jukebox," MusicMatch Jukebox v4 Help, pp. 1-4, (1999).

TuneBase Pro Mk-II User's Guide, Escient, Inc., (1999).
Office Action in U.S. Appl. No. 11/608,211, mailed Apr. 9, 2009.
Office Action in U.S. Appl. No. 11/608,211, mailed Nov. 12, 2008.
Robbin et al., U.S. Office Action mailed Nov. 17, 2004, directed to U.S. Appl. No. 10/282,861; 6 pages.
Robbin et al., U.S. Office Action mailed Jul. 13, 2005, directed to U.S. Appl. No. 10/282,861; 6 pages.
Robbin et al., U.S. Office Action mailed Jan. 25, 2006, directed to U.S. Appl. No. 10/282,861; 7 pages.
Robbin et al., U.S. Office Action mailed Oct. 19, 2006, directed to U.S. Appl. No. 10/282,861; 7 pages.
Robbin et al., U.S. Office Action mailed Oct. 6, 2008, directed to U.S. Appl. No. 11/238,587; 8 pages.
Robbin et al., U.S. Office Action mailed Apr. 29, 2009, directed to U.S. Appl. No. 11/564,828; 8 pages.
Robbin et al., U.S. Office Action mailed Oct. 2, 2008, directed to U.S. Appl. No. 11/564,828; 8 pages.
Robbin et al., U.S. Office Action mailed Sep. 16, 2009, directed to U.S. Appl. No. 11/608,211; 8 pages.
Robbin et al., U.S. Office Action mailed Oct. 2, 2008 directed to U.S. Appl. No. 11/608,212; 6 pages.
M. Nilsson; ID3 tag version 2.3.0; Feb. 3, 1999. http://www.id3lib.org/id3v2.3.0.html.
M. Nilsson; ID3 tag version 2.4.0—Main Structure; Nov. 1, 2000. http://www.id3.org/id3v2.4.0.html.
Australian Office Action mailed Jul. 17, 2009, directed to related application No. 2006284665; 2 pages.
Canadian Exam Report dated Feb. 8, 2010, directed to related Canadian Application No. 2,621,128; 4 pages.
Robbin et al., U.S. Office Action mailed May 24, 2010, directed to U.S. Appl. No. 11/608,211; 12 pages.
Chinese Office Action dated Jan. 29, 2010, directed to application No. 200680040230.4; 9 pages.

* cited by examiner

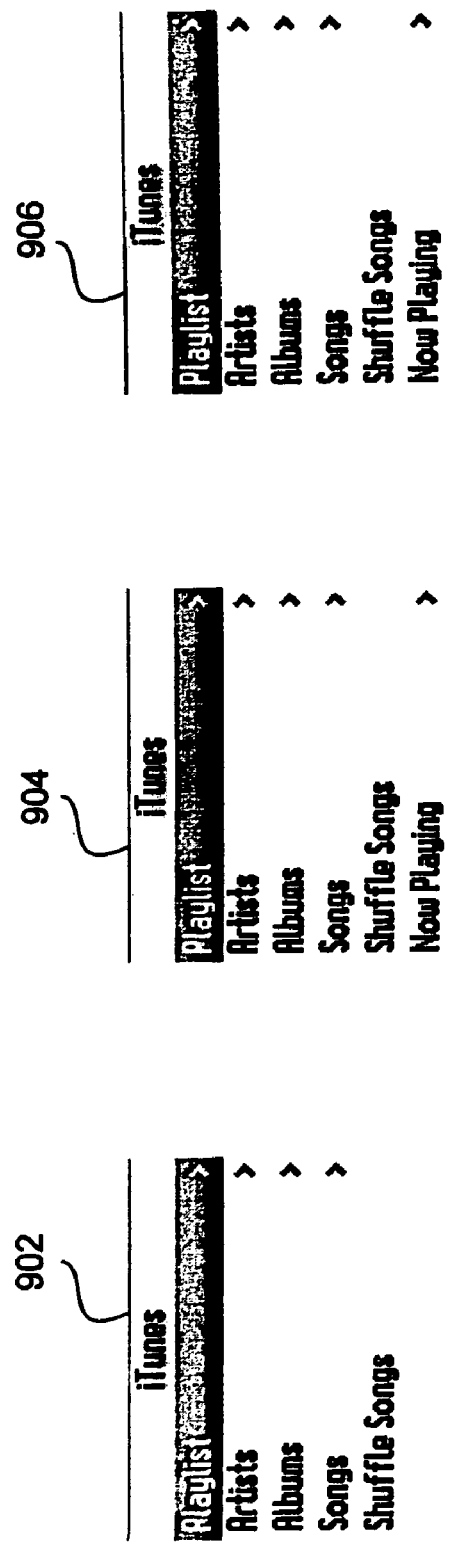
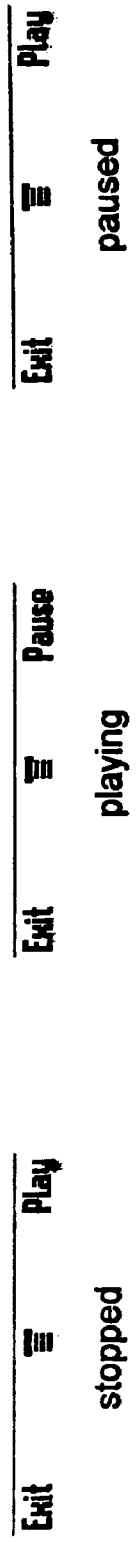
Fig. 9A — stopped
Fig. 9B — playing
Fig. 9C — paused

2702

| All Songs |
|---|
| Space needed: 5 MB |
| A Man and a Woman  4.4 MB |
| All Because of You  3.6 MB |
| All Blues  10.9 MB |
| Ballad of a Thin M...  5.9 MB |
| Blue In Green  5.4 MB |
| City of Blinding Li...  5.6 MB |
| Crumbs from Your ...  4.9 MB |
| Back  Delete |

| Kind of Blue |
|---|
| Space needed: 5 MB |
| So What  8.9 MB |
| Freddie Freeloader  9.3 MB |
| Blue In Green  5.4 MB |
| All Blues  10.9 MB |
| Flamenco Sketches  8.9 MB |
| Flamenco Sketches (A...  9 MB |
| Back  Delete |

| Text | Action | Behavior |
|---|---|---|
| Playlist | select | Displays the Playlist screen<br>Visible only if no playlists (other than the master playlist) are present on the handset. |
| Playlists | select | Displays the Playlists screen.<br>Visible only if one or more playlists (other than the master playlist) are present on the handset. |
| Artists | select | Displays the Artists screen.<br>with all the artists in the library. |
| Albums | select | Displays the Albums screen with all the albums in the library. |
| Songs | select | Displays the Songs screen with all the tracks in the library. |
| Shuffle Songs | select | Selects all the tracks in the master playlist, shuffles the order of the tracks, starts playback of the first track, and displays the Now Playing screen. |
| Now Playing | select | Displays the Now Playing screen. Visible only if a track is playing or paused. |

Fig. 31

Soft Keys

Player State: Stopped

| Key | Label | Behavior |
|---|---|---|
| Left | Exit | Exits the application. |
| Center | ☰ | Displays the context-sensitive menu (Error! Reference source not found.). |
| Right | Play | Selects all the tracks in the master playlist, shuffling the order of the tracks if Shuffle Songs is highlighted, starts playback of the first track, and displays the Now Playing screen (Error! Reference source not found.). |

Player State: Playing

| Key | Label | Behavior |
|---|---|---|
| Left | Exit | Exits the application. |
| Center | ☰ | Displays the context-sensitive menu (Error! Reference source not found.). |
| Right | Pause | Pauses playback of the current track. |

Player State: Paused

| Key | Label | Behavior |
|---|---|---|
| Left | Exit | Exits the application. |
| Center | ☰ | Displays the context-sensitive menu. |
| Right | Play | Resumes playback of the current track, if Shuffle Songs is not highlighted; otherwise shuffles the order of the tracks in the master playlist, starts playback of the first track, and displays the Now Playing screen. |

FIG. 32

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | *none* | *none* |
| → | Selects the highlighted list item. | n/a |
| Select | Selects the highlighted list item. | n/a |

Keypad Keys

| Key | Short Press Behavior | Long Press Behavior |
|---|---|---|
| 0..9 | *none* | *none* |
| * | *none* | *none* |
| # | *none* | *none* |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 33

| Text | Action | Behavior |
|---|---|---|
| device name | select | Selects the master playlist, which includes all the tracks in the library, and displays the Playlist screen. |
| playlist name | select | Selects the highlighted playlist and displays the Playlist screen. |

FIG. 34

Soft Keys

Player State: Paused/Stopped

| Key | Label | Behavior |
|---|---|---|
| Left | Back | Displays the previous screen. |
| Center |  | Displays the context-sensitive menu. |
| Right | Play | Selects all the tracks in the highlighted playlist, starts playback of the first track in the playlist, and displays the Now Playing screen. |

Player State: Playing

| Key | Label | Behavior |
|---|---|---|
| Left | Back | Displays the previous screen. |
| Center |  | Displays the context-sensitive menu. |
| Right | Pause | Pauses playback of the current track. |

FIG. 35

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 36

List Items

| Text | Action | Behavior |
|---|---|---|
| track name | select | Selects all the tracks in the playlist, starts playback of the highlighted track, and displays the Now Playing screen. |

FIG. 37

Soft Keys

Player State: Paused/Stopped

| Key | Label | Behavior |
|---|---|---|
| Left | Back | Displays the previous screen. |
| Center | ☰ | Displays the context-sensitive menu. |
| Right | Play | Selects all the tracks in the playlist, starts playback of the highlighted track, and displays the Now Playing screen.. |

Player State: Playing

| Key | Label | Behavior |
|---|---|---|
| Left | Back | Displays the previous screen. |
| Center | ☰ | Displays the context-sensitive menu. |
| Right | Pause | Pauses playback of the current track. |

FIG. 38

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | none | none |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 39

| Text | Action | Behavior |
|---|---|---|
| All | select | Selects all the artists and displays the Albums screen with all the albums by all the artists. |
| *artist name* | select | Selects the highlighted artist and displays the Albums screen with all the albums by the selected artist. |

FIG. 40

Soft Keys

Player State: Paused/Stopped

| Key | Label | Behavior |
|---|---|---|
| Left | Back | Displays the previous screen. |
| Center | ☰ | Displays the context-sensitive menu. |
| Right | Play | Selects the highlighted artist, starts playback of the first track by the selected artist, and displays the Now Playing screen. |

Player State: Playing

| Key | Label | Behavior |
|---|---|---|
| Left | Back | Displays the previous screen. |
| Center | ☰ | Displays the context-sensitive menu. |
| Right | Pause | Pauses playback of the current track. |

FIG. 41

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 42

| Text | Action | Behavior |
|---|---|---|
| All | select | Selects all the albums and displays the Songs screen with all the tracks in all the albums. |
| *album name* | select | Selects the highlighted album and displays the Songs screen with all the tracks in the selected album. |

FIG. 43

Soft Keys

Player State: Paused/Stopped

| Key | Label | Behavior |
|---|---|---|
| Left | Back | Displays the previous screen. |
| Center | ☰ | Displays the context-sensitive menu. |
| Right | Play | Selects the highlighted album, starts playback of the first track in the selected album, and displays the Now Playing screen. |

Player State: Playing

| Key | Label | Behavior |
|---|---|---|
| Left | Back | Displays the previous screen. |
| Center | ☰ | Displays the context-sensitive menu. |
| Right | Pause | Pauses playback of the current track. |

FIG. 44

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 45

List items

| Text | Action | Behavior |
|---|---|---|
| *track name* | select | Displays the Now Playing screen and starts playback of the tracks in the list, starting with the selected track. |

FIG. 46

Soft Keys

Player State: Paused/Stopped

| Key | Label | Behavior |
|---|---|---|
| Left | Back | Displays the previous screen. |
| Center | ☰ | Displays the context-sensitive menu. |
| Right | Play | Displays the Now Playing screen and starts playback of the tracks in the list, starting with the selected track. |

Player State: Playing

| Key | Label | Behavior |
|---|---|---|
| Left | Back | Displays the previous screen. |
| Center | ☰ | Displays the context-sensitive menu. |
| Right | Pause | Pauses playback of the current track. |

FIG. 47

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

Mode: All Songs

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | none | none |
| # | none | none |

Mode: Songs for Album

| Key | Short Press Behavior | Long Press Behavior |
|---|---|---|
| 0..9 | none | none |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 48

Repeat Indicator

| Setting | Icon |
|---|---|
| Off | none |
| One | 🔁 |
| All | 🔁 |

Shuffle Indicator

| Setting | Icon |
|---|---|
| Off | none |
| Songs or Albums | 🔀 |

FIG. 49

Soft Keys

Player State: Playing

| Key | Label | Behavior |
|---|---|---|
| Left | Back | Displays the previous screen if in progress mode, or switches to progress mode if in artwork, position, rating or volume mode. |
| Center | ☰ | Displays the Contextual Menu screen. |
| Right | Pause | Pauses playback of the current track. |

Player State: Paused

| Key | Label | Behavior |
|---|---|---|
| Left | Back | Displays the previous screen if in progress mode, or switches to progress mode if in artwork, position, rating or volume mode. |
| Center | ☰ | Displays the Contextual Menu screen. |
| Right | Play | Resumes playback of the current track. |

FIG. 50

Navigation Keys

Screen Mode: Progress

| Key | Short Press Behavior | Long Press Behavior |
|---|---|---|
| ↑ | Increases the volume level of the player and switches to volume mode. | n/a |
| ↓ | Decreases the volume level of the player and switches to volume mode. | n/a |
| ← | Moves the playback position to the beginning of the current track, or goes to the previous track in the play order if the playback position is within the first 5 seconds of the track, or goes back to the Main Menu screen if the current track is the first track in the play order and the repeat setting is Off. | Moves the playback position backward, starting in 5-second increments and accelerating in larger increments while the key is held. |
| → | Goes to the next track in the play order, or goes back to the Main Menu screen if the current track is the last track in the play order and the repeat setting is Off. | Moves the playback position forward, starting in 5-second increments and accelerating in larger increments while the key is held. |
| Select | Switches to artwork mode if album artwork is available for the current track, otherwise switches to position mode. | n/a |

FIG. 51A

Screen Mode: Artwork

| Key | Short Press Behavior | Long Press Behavior |
|---|---|---|
| ↑ | Increases the volume level of the player and switches to volume mode. | n/a |
| ↓ | Decreases the volume level of the player and switches to volume mode. | n/a |
| ← | Moves the playback position to the beginning of the current track and switches to progress mode, or goes to the previous track in the play order if the playback position is within the first 5 seconds of the track and switches to progress mode, or goes back to the Main Menu screen if the current track is the first track in the play order and the repeat setting is Off. | Moves the playback position backward, starting in 5-second increments and accelerating in larger increments while the key is held, and switches to progress mode. |
| → | Goes to the next track in the play order and switches to progress mode, or goes back to the Main Menu screen if the current track is the last track in the play order and the repeat setting is Off. | Moves the playback position forward, starting in 5-second increments and accelerating in larger increments while the key is held, and switches to progress mode. |
| Select | Switches to position mode. | n/a |

Screen Mode: Position

| Key | Short Press Behavior | Long Press Behavior |
|---|---|---|
| ↑ | Increases the volume level of the player and switches to volume mode. | n/a |
| ↓ | Decreases the volume level of the player and switches to volume mode. | n/a |
| ← | Moves the playback position backward by 5 seconds. | Moves the playback position backward, starting in 5-second increments and accelerating in larger increments while the key is held. |
| → | Moves the playback position forward by 5 seconds. | Moves the playback position forward, starting in 5-second increments and accelerating in larger increments while the key is held. |
| Select | Switches to rating mode. | n/a |

FIG. 51B

Screen Mode: Rating

| Key | Short Press Behavior | Long Press Behavior |
|---|---|---|
| ↑ | Increases the volume level of the player and switches to volume mode. | n/a |
| ↓ | Decreases the volume level of the player and switches to volume mode. | n/a |
| ← | Decreases the user rating for the current track. | Auto-repeats. |
| → | Increases the user rating for the current track. | Auto-repeats. |
| Select | Switches to progress mode. | n/a |

FIG. 51C

Screen Mode: Volume

| Key | Short Press Behavior | Long Press Behavior |
|---|---|---|
| ↑ | Increases the volume level of the player. | Auto-repeats. |
| ↓ | Decreases the volume level of the player. | Auto-repeats. |
| ← | Moves the playback position to the beginning of the current track and switches to progress mode, or goes to the previous track in the play order if the playback position is within the first 5 seconds of the track and switches to progress mode, or goes back to the Main Menu screen if the current track is the first track in the play order and the repeat setting is Off. | Moves the playback position backward, starting in 5-second increments and accelerating in larger increments while the key is held, and switches to progress mode. |
| → | Goes to the next track in the play order and switches to progress mode, or goes back to the Main Menu screen if the current track is the last track in the play order and the repeat setting is Off. | Moves the playback position forward, starting in 5-second increments and accelerating in larger increments while the key is held, and switches to progress mode. |
| Select | Switches to progress mode. | n/a |

Keypad Keys

| Key | Short Press Behavior | Long Press Behavior |
|---|---|---|
| 0..9 | none | none |
| * | none | none |
| # | none | none |

Side Keys

| Key | Short Press Behavior | Long Press Behavior |
|---|---|---|
| Scroll Up | Increases the volume level of the player and switches to volume mode. | Auto-repeats. |
| Scroll Down | Decreases the volume level of the player and switches to volume mode. | Auto-repeats. |

FIG. 51D

| Text | Action | Behavior |
|------|--------|----------|
| Hide | highlight | Sets the right soft key label to Select. |
| | select | Puts the iTunes Mobile application in background mode and starts the idle application, so that metadata and progress information for the current track is displayed in the idle screen. Visible only if a track is playing or paused. |
| Now Playing | highlight | Sets the right soft key label to Select. |
| | select | Goes to the Now Playing screen. Visible only if a track is playing or paused. |
| Shuffle | highlight | Sets the right soft key label to Change. |
| | select | Cycles the shuffle setting among Off, Songs and Albums. |
| Repeat | highlight | Sets the right soft key label to Change. |
| | select | Cycles the repeat setting among Off, One and All. |
| About | highlight | Sets the right soft key label to Select. |
| | select | Displays the About screen. |
| Legal | highlight | Sets the right soft key label to Select. |
| | select | Displays the Legal screen. |

FIG. 52

Soft Keys

"Hide", "Now Playing", "About" or "Legal" Highlighted

| Key | Label | Behavior |
|---|---|---|
| Left | Back | Displays the previous screen. |
| Center | *none* | *none* |
| Right | Select | Selects the highlighted list item. |

"Shuffle" or "Repeat" Highlighted

| Key | Label | Behavior |
|---|---|---|
| Left | Back | Displays the previous screen. |
| Center | *none* | *none* |
| Right | Change | Cycles the highlighted setting among its values. |

FIG. 53

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | *none* | *none* |
| * | *none* | *none* |
| # | *none* | *none* |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

*FIG. 54*

| Label | Value |
|---|---|
| Songs | The total number of tracks in the library and the maximum number of tracks supported by the device. |
| Capacity | The capacity of the flash memory card, formatted in MB or KB as appropriate. |
| Available | The available space on the flash memory card, formatted in MB or KB as appropriate. |
| Version | The version of the iTunes Mobile application. |

FIG. 55

Soft Keys

| Key | Label | Behavior |
|---|---|---|
| Left | Back | Displays the previous screen. |
| Center | *none* | *none* |
| Right | *none* | *none* |

FIG. 56

Navigation Keys

| Key | Short Press Behavior | Long Press Behavior |
|---|---|---|
| ↑ | Scrolls the list up by one page. | Auto-repeats. |
| ↓ | Scrolls the list down by one page. | Auto-repeats. |
| ← | Displays the previous screen. | n/a |
| → | none | none |
| Select | none | none |

Keypad Keys

| Key | Short Press Behavior | Long Press Behavior |
|---|---|---|
| 0..9 | none | none |
| * | none | none |
| # | none | none |

Side Keys

| Key | Short Press Behavior | Long Press Behavior |
|---|---|---|
| Scroll Up | none | none |
| Scroll Down | none | none |

*FIG. 57*

Soft Keys

| Key | Label | Behavior |
|---|---|---|
| Left | Back | Displays the previous screen. |
| Center | *none* | *none* |
| Right | *none* | *none* |

FIG. 58

Navigation Keys

| Key | Short Press Behavior | Long Press Behavior |
|---|---|---|
| ↑ | Scrolls the list up by one page. | Auto-repeats. |
| ↓ | Scrolls the list down by one page. | Auto-repeats. |
| ← | Displays the previous screen. | n/a |
| → | none | none |
| Select | none | none |

Keypad Keys

| Key | Short Press Behavior | Long Press Behavior |
|---|---|---|
| 0..9 | none | none |
| * | none | none |
| # | none | none |

Side Keys

| Key | Short Press Behavior | Long Press Behavior |
|---|---|---|
| Scroll Up | Scrolls the list up by one page. | Auto-repeats. |
| Scroll Down | Scrolls the list down by one page. | Auto-repeats. |

*FIG. 59*

| Text | Action | Behavior |
|------|--------|----------|
| Artists | select | Selects all the artists in the library and displays the Delete Artists screen. |
| Albums | select | Selects all the albums in the library and displays the Delete Albums screen. |
| Songs | select | Selects all the songs in the library and displays the Delete Songs screen. |

FIG. 60

Soft Keys

| Key | Label | Behavior |
|---|---|---|
| Left | Back | Exits the application. |
| Center | *none* | *none* |
| Right | Select | Selects the highlighted list item. |

FIG. 61

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | none | none |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

*FIG. 62*

| Text | Action | Behavior |
|---|---|---|
| All | highlight | Sets the right soft key label to Select. |
| | select | Selects all the artists and displays the Delete Albums screen with all the albums by all the artists. |
| *artist name* | highlight | Sets the right soft key label to Delete. |
| | select | Selects the highlighted artist and displays the Delete Albums screen with all the albums by the selected artist. |

FIG. 63

Soft Keys

"All" Highlighted

| Key | Label | Behavior |
|---|---|---|
| Left | Back | Displays the previous screen. |
| Center | none | none |
| Right | Select | Selects the highlighted list item. |

Artist Name Highlighted

| Key | Label | Behavior |
|---|---|---|
| Left | Back | Displays the previous screen. |
| Center | none | none |
| Right | Delete | Displays the confirm dialog with the name of the highlighted artist. If "Yes" is selected, deletes all the tracks by the artist from the library and displays the deleted transient for 2 seconds. |

FIG. 64

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | *none* | *none* |
| # | *none* | *none* |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 65A

| Text | Action | Behavior |
|---|---|---|
| All | highlight | Sets the right soft key label to Select. |
| | select | Selects all the albums and displays the Deletes Songs screen with all the tracks in all the albums. |
| *album name* | highlight | Sets the right soft key label to Delete. |
| | select | Selects the highlighted album and displays the Delete Songs screen with the tracks in the selected album. |

FIG. 65B

Soft Keys

"All" Highlighted

| Key | Label | Behavior |
|---|---|---|
| Left | Back | Displays the previous screen. |
| Center | *none* | *none* |
| Right | Select | Selects the highlighted list item. |

Artist Name Highlighted

| Key | Label | Behavior |
|---|---|---|
| Left | Back | Displays the previous screen. |
| Center | *none* | *none* |
| Right | Delete | Displays the confirm dialog with the name of the highlighted album. If "Yes" is selected, deletes all the tracks in the album from the library and displays the deleted transient for 2 seconds. |

FIG. 66

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | none | none |
| # | none | none |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

*FIG. 67*

| Text | Action | Behavior |
|---|---|---|
| *track name* | highlight | Stops any track that is currently playing and starts playing the highlighted track after a 750 ms delay. |
| | select | Displays the confirm dialog with the name of the highlighted song. If "Yes" is selected, deletes the track for the song from the library and displays the deleted transient for 2 seconds. |

FIG. 68

Soft Keys

| Key | Label | Behavior |
|---|---|---|
| Left | Back | Displays the previous screen. |
| Center | *none* | *none* |
| Right | Delete | Displays the confirm dialog with the name of the highlighted song. If "Yes" is selected, deletes the track for the song from the library and displays the deleted transient for 2 seconds. |

FIG. 69

Navigation Keys

| Key | Short Press Behavior | Long Press Behavior |
|---|---|---|
| ↑ | Highlights the list item above the currently highlighted item, or the last item if the first item is highlighted. | Auto-repeats. |
| ↓ | Highlights the list item below the currently highlighted item, or the first list item if the last item is highlighted. | Auto-repeats. |
| ← | Displays the previous screen. | n/a |
| → | Selects the highlighted list item. | n/a |
| Select | Selects the highlighted list item. | n/a |

Keypad Keys

Mode: All Songs

| Key | Short Press Behavior | Long Press Behavior |
|---|---|---|
| 0..9 | Highlights the first list item that matches the letter on the key, in the standard multi-tap order. | Highlights the first list item that matches the number of the key. |
| * | *none* | *none* |
| # | *none* | *none* |

Mode: Songs for Album

| Key | Short Press Behavior | Long Press Behavior |
|---|---|---|
| 0..9 | *none* | *none* |
| * | *none* | *none* |
| # | *none* | *none* |

Side Keys

| Key | Short Press Behavior | Long Press Behavior |
|---|---|---|
| Scroll Up | Highlights the list item above the currently highlighted item, or the last item if the first item is highlighted. | Scrolls the list up by one page. |
| Scroll Down | Highlights the list item below the currently highlighted item, or the first list item if the last item is highlighted. | Scrolls the list down by one page. |

FIG. 70

MANAGEMENT OF FILES IN A PERSONAL COMMUNICATION DEVICE

CROSS REFERENCE TO RELATED APPLICATIONS

This application is a continuation of U.S. patent application Ser. No. 11/221,368, filed Sep. 6, 2005, now abandoned entitled "MANAGEMENT OF FILES IN A PERSONAL COMMUNICATION DEVICE," which is hereby incorporated herein by reference, and which is a Continuation-in-Part of U.S. patent application Ser. No. 10/282,861, filed Oct. 28, 2002, now U.S. Pat. No. 7,166,791 entitled "GRAPHICAL USER INTERFACE AND METHODS OF USE THEREOF IN A MULTIMEDIA PLAYER," which is hereby incorporated herein by reference, and which, in turn, claims the benefit of priority from U.S. Provisional Patent Application No. 60/399,806, filed Jul. 30, 2002, entitled "GRAPHICAL USER INTERFACE AND METHODS OF USE THEREOF IN A MULTIMEDIA PLAYER," which is hereby incorporated herein by reference.

This application also claims the priority benefit of U.S. Patent Provisional Application No. 60/714,537, filed Sep. 2, 2005, entitled "MANAGEMENT OF FILES IN A PERSONAL COMMUNICATION DEVICE," which is hereby incorporated herein by reference.

BACKGROUND OF THE INVENTION

1. Field of Invention

This invention relates generally to portable communication devices both wired and wireless in nature. More specifically, the invention describes a graphical user interface for use in a portable wireless communication device suitable for assisting a user in retrieving and accessing files stored therein.

2. Description of Related Art

Recent developments in consumer electronics have included the introduction of portable communication devices such as cell phones, Personal Digital Assistants (PDAs), MP3 players, minidisk players, and the like. For example, in the case of an MP3 player, a number of digitized audio files in the form of MP3 files are stored in a storage medium included in the MP3 player. In the case of MP3 files, for example, a user of the MP3 player must be able to peruse and select a particular file, or files, based upon such characteristics as music genre, author, album, or whatever grouping of MP3 files is present in the MP3 player. In other examples, cell phones and PDAs have been upgraded to include both still picture and video capture functions as well as acting as a repository of personal information (such as phone numbers, addresses) which require new and more efficient methods of locating and retrieving sought out information and/or files.

What is required is a user interface that provides for a user friendly and efficient retrieval of stored data in a portable communication device such as a cell phone, multimedia player, and the like.

SUMMARY OF THE INVENTION

The invention described herein pertains to a user interface that provides for a user friendly and efficient utilization of stored multimedia asset files.

In one embodiment, a method of assisting user interaction with a personal portable wireless device by way of a hierarchically ordered user interface is described. The method includes at least the operations of: displaying a first order user interface having a first list of user selectable items each of which points to at least one of a second list of user selectable items displayed on a corresponding second order user interface; receiving a user selection of one of the user selectable items from the first list; and automatically transitioning to and displaying the second order user interface based upon the selected one of the user selectable items from the first list, wherein each of the user selectable items in the second list points back to the corresponding one of the user selectable items in the first list and points forward to at least one of a user selectable items in a third list displayed on a corresponding third order user interface, and wherein each of the user selectable items in the second list are different from the first list of user selectable items.

In yet another embodiment, a method of assisting a user in interacting with the selectable items displayed on a mobile phone is described. The method includes at least the operations of: displaying the selectable items on the display screen; receiving a key press corresponding to a selected physical key; determining a duration of time of the pressing of the selected physical key; displaying a resulting action on the display screen based upon the received key press; and, if the duration of time is greater than a predetermined amount of time, then applying an acceleration adjustment to the resulting action based on the duration of time.

These and other features of the present invention will be described in more detail below in the detailed description of the invention and in conjunction with the following figures.

BRIEF DESCRIPTION OF THE DRAWINGS

The invention will be better understood by reference to the following description taken in conjunction with the accompanying drawings.

FIGS. 9A-9C show a main menu screen each being associated with a particular operational state (i.e., stopped in FIG. 9A, playing in FIG. 9B, or stopped in FIG. 9C) of the personal communication device.

FIG. 27 shows a delete songs screen in accordance with an embodiment of the invention.

FIGS. 31-63 show operational tables for each of the above described menu screens for list items, soft keys, and hard keys in accordance with an embodiment of the invention.

FIG. 31 is a list item operational table for the main menu screen in accordance with an embodiment of the invention.

FIG. 32 is a soft key operational table for the main menu screen in accordance with an embodiment of the invention.

FIG. 33 is a hard key operational table for the main menu screen in accordance with an embodiment of the invention.

FIG. 34 is a list item operational table for the playlist screen in accordance with an embodiment of the invention.

FIG. 35 is a soft key operational table for the playlist screen in accordance with an embodiment of the invention.

FIG. 36 is a hard key operational table for the playlist screen in accordance with an embodiment of the invention.

FIG. 37 is a list item operational table for the playlists screen in accordance with an embodiment of the invention.

FIG. 38 is a soft key operational table for the playlists screen in accordance with an embodiment of the invention.

FIG. 39 is a hard key operational table for the playlists screen in accordance with an embodiment of the invention.

FIG. 40 is a list item operational table for the artists screen in accordance with an embodiment of the invention.

FIG. 41 is a soft key operational table for the artists screen in accordance with an embodiment of the invention.

FIG. 42 is a hard key operational table for the artists screen in accordance with an embodiment of the invention.

FIG. 43 is a list item operational table for the albums screen in accordance with an embodiment of the invention.

FIG. 44 is a soft key operational table for the albums screen in accordance with an embodiment of the invention.

FIG. 45 is a hard key operational table for the albums screen in accordance with an embodiment of the invention.

FIG. 46 is a list item operational table for the songs screen in accordance with an embodiment of the invention.

FIG. 47 is a soft key operational table for the songs screen in accordance with an embodiment of the invention.

FIG. 48 is a hard key operational table for the songs screen in accordance with an embodiment of the invention.

FIG. 49 is a repeat indicator and shuffle indicator operational table for the now playing screen in accordance with an embodiment of the invention.

FIG. 50 is a soft key operational table for the now playing screen in accordance with an embodiment of the invention.

FIGS. 51A-51D are a hard key operational table for the now playing screen in accordance with an embodiment of the invention.

FIG. 52 is a list item operational table for the contextual menu screen in accordance with an embodiment of the invention.

FIG. 53 is a soft key operational table for the contextual menu screen in accordance with an embodiment of the invention.

FIG. 54 is a hard key operational table for the contextual menu screen in accordance with an embodiment of the invention.

FIG. 55 is a list item operational table for the about screen in accordance with an embodiment of the invention.

FIG. 56 is a soft key operational table for the about screen in accordance with an embodiment of the invention.

FIG. 57 is a hard key operational table for the about screen in accordance with an embodiment of the invention.

FIG. 58 is a soft key operational table for the legal screen in accordance with an embodiment of the invention.

FIG. 59 is a hard key operational table for the legal screen in accordance with an embodiment of the invention.

FIG. 60 is a list item operational table for the delete menu screen in accordance with an embodiment of the invention.

FIG. 61 is a soft key operational table for the delete menu screen in accordance with an embodiment of the invention.

FIG. 62 is a hard key operational table for the delete menu screen in accordance with an embodiment of the invention.

FIG. 63 is a list item operational table for the delete artists screen in accordance with an embodiment of the invention.

FIG. 64 is a soft key operational table for the delete artists screen in accordance with an embodiment of the invention.

FIG. 65 is a hard key operational table for the delete artists screen in accordance with an embodiment of the invention.

FIG. 66 is a list item operational table for the delete albums screen in accordance with an embodiment of the invention.

FIG. 67 is a soft key operational table for the delete albums screen in accordance with an embodiment of the invention.

FIG. 68 is a hard key operational table for the delete albums screen in accordance with an embodiment of the invention.

FIG. 69 is a list item operational table for the delete songs screen in accordance with an embodiment of the invention.

FIG. 70 is a soft key operational table for the delete songs screen in accordance with an embodiment of the invention.

DETAILED DESCRIPTION OF SELECTED EMBODIMENTS

Figure 1:
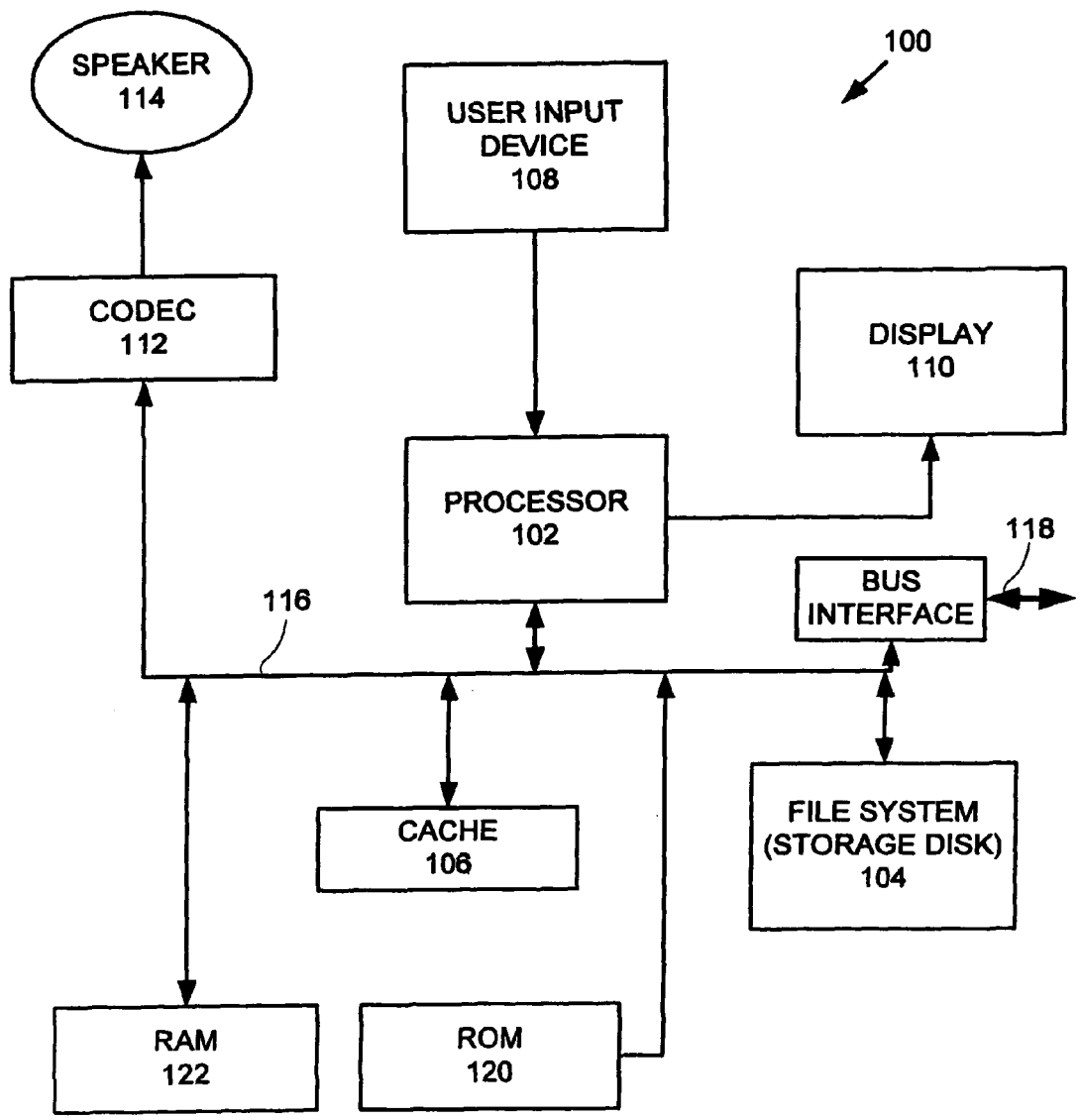
FIG. 1 shows an exemplary portable multimedia device in accordance with an embodiment of the invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

With the rapid advancement in the ability to store data, personal communication devices, such as MP3 players, cell phones (mobile phones), PDAs, and the like, can accommodate hundreds or even thousands of such data files making the task of selecting, grouping, or retrieving a particular file, or files, a daunting task indeed. Therefore the invention described herein is well suited for providing a user friendly user interface which provides efficient retrieval of data files for use by a portable communication device. Portable communication devices include wireless communication devices as well those communication devices tethered by way of a data link (such as a cable) to a server or other such device.

In the described embodiment, the personal communication device takes the form of a pocket size wireless communication device, such as a cell phone having a display screen suitable for displaying a graphical user interface (GUII) as well as a number of input sensors (such as buttons, dials, wheels, etc.) arrange to receive user supplied input events. Such user supplied inputs can include user supplied commands directed at retrieving specific files, such as digital media, such as audio files, image files, or video files.

In one embodiment, a hierarchically ordered graphical user interface are provided that facilitates a user file selection procedure. In this particular embodiment, a first order (sometimes referred to as a home interface) provides a highest order of user selectable items each of which, when selected, results in an automatic transition to a lower order user interface associated with the selected item. In one of the described embodiments, the lower order interface includes other user selectable items associated with the previously selected item from the higher order user interface. In this way, a user can automatically transition from a higher order interface to a lower order interface (and vice versa) by, in some cases, a direct transition. In other cases, the user can transition from the higher order user interface to the lower order user interface (and vice versa) in a stepwise fashion whereby each intervening interface is displayed having any number of user selectable input items each directly associated with the previously selected input item.

In a particular embodiment, the portable multimedia device is a pocket sized, multimedia device (personal digital assistant, personal MP3 player/recorder, and the like) having a display screen arranged to display the various user interfaces and a corresponding user input device. The user input device is typically a manually operated switch, button, dial, wheel, or other such contrivances. Accordingly, the invention will now be described in terms a portable multimedia device (capable of storing a number of multimedia assets. For example, in the case of the multimedia device being a multimedia asset player, the multimedia assets can include audio files, image files or video files, as well as any other appropriately formatted data files.

Accordingly, FIG. 1 shows an exemplary portable multimedia device, or media player, 100 in accordance with an embodiment of the invention. The media player 100 includes a processor 102 that pertains to a microprocessor or controller for controlling the overall operation of the media player 100. The media player 100 stores media data pertaining to media assets in a file system 104. The file system 104 is, typically, a storage disk or a plurality of disks. Alternatively, the file system 104 can be re-writable non-volatile memory, such as FLASH memory. The file system 104 typically provides high capacity storage capability for the media player 100. However, since the access time to the file system 104 is relatively slow, the media player 100 can also include a cache 106. The cache 106 is, for example, Random-Access Memory (RAM) provided by semiconductor memory. The relative access time to the cache 106 is substantially shorter than for the file system 104. However, the cache 106 does not have the large storage capacity of the file system 104. Further, the file system 104, when active, consumes more power than does the cache 106. The media player 100 also includes a RAM 120 and a Read-Only Memory (ROM) 122. The ROM 122 can store programs, utilities or processes to be executed in a non-volatile manner. The RAM 120 provides volatile data storage, such as for the cache 106.

The media player 100 also includes a user input device 108 that allows a user of the media player 100 to interact with the media player 100. For example, the user input device 108 can take a variety of forms, such as a button, keypad, dial, wheel, etc. Still further, the media player 100 includes a display 110 (screen display) that can be controlled by the processor 102 to display information to the user. A data bus 116 can facilitate data transfer between at least the file system 104, the cache 106, the processor 102, and the CODEC 112. The media player 100 also includes a bus interface 116 that couples to a data link 118. The data link 118 allows the media player 100 to couple to a host computer.

In one embodiment, the media player 100 serves to store a plurality of media assets (e.g., songs) in the file system 104. When a user desires to have the media player play a particular media item, a list of available media assets is displayed on the display 110. Then, using the user input device 108, a user can select one of the available media assets. The processor 102, upon receiving a selection of a particular media item, supplies the media data (e.g., audio file) for the particular media item to a coder/decoder (CODEC) 112. The CODEC 112 then produces analog output signals for a speaker 114. The speaker 114 can be a speaker internal to the media player 100 or external to the media player 100. For example, headphones or earphones that connect to the media player 100 would be considered an external speaker.

For example, in a particular embodiment, the available media assets are arranged in a hierarchical manner based upon a selected number and type of groupings appropriate to the available media assets. For example, in the case where the media player 100 is a music player, the available media assets take the form of audio files (each of which corresponds to a digitally encoded song or other audio rendition) stored at least in part in the file system 104. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, a list of songs for each album listed in the third level at a fourth level, and so on.

Figure 2:
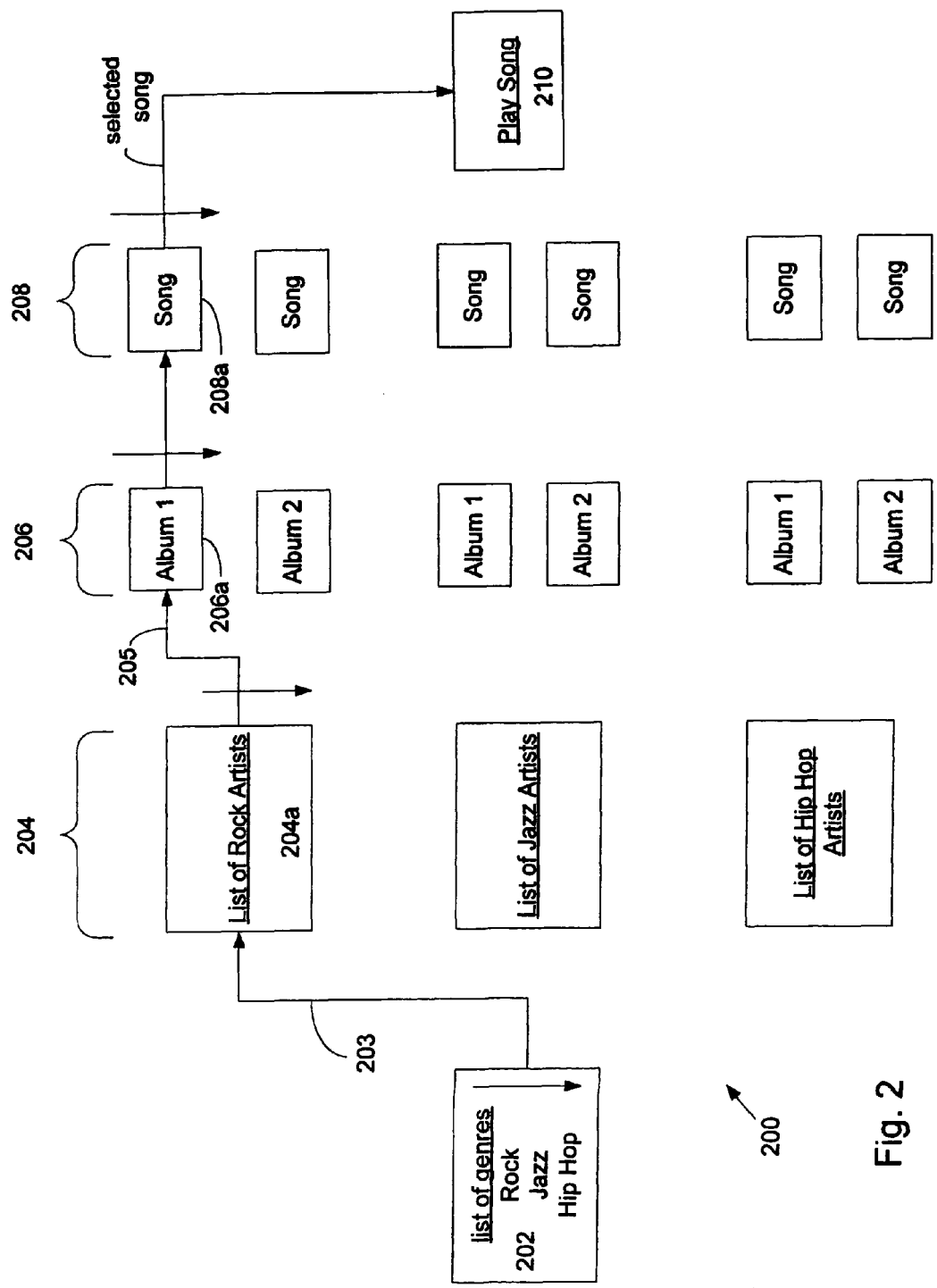
FIG. 2 illustrates a hierarchically ordered menu corresponding to stored media assets in accordance with an embodiment of the invention.

Accordingly, FIG. 2 illustrates an hierarchically ordered menu 200 used to navigate through those stored media assets of interest to a user in accordance with an embodiment of the invention. It should be noted that in the described embodiment, the menu 200 is navigated by the user scrolling vertically within a particular level in order to peruse and eventually select a particular item located within that level. Once selected, the menu 200 is automatically transitioned in a horizontal manner to a lower order interface associated with the selected item. For example, at a first level, a list of music genres 202 (ROCK, JAZZ, HIP HOP) corresponding to the available audio files is displayed. In order to select a particular music genre, a user scrolls "vertically down" the list 202 (usually accompanied by a pointer such as an arrow or by highlighting the adjacent item) until a desired input item is reached. Upon selecting a particular music genre (ROCK, for example), an automatic horizontal traversal 203 to a lower order interface 204 that includes a display of a list of ROCK artists 204a corresponding to the selected ROCK genre. Again after scrolling in a vertical direction in the ROCK artists list 204a, a user selects a particular one of the listed ROCK artists included in the list 204a resulting in another automatic horizontal traversal 205 to a lower order interface 206 denoting an album 206a (from a list of albums 206, if appropriate) associated with the selected artist. This procedure is continued until a particular song 208a from a list of songs 208 (included in the selected album) is selected. Once selected, the song 208a is then ready to be played as described at a play song interface 210 that can in some cases include information related to the selected song 208a.

Figure 3:
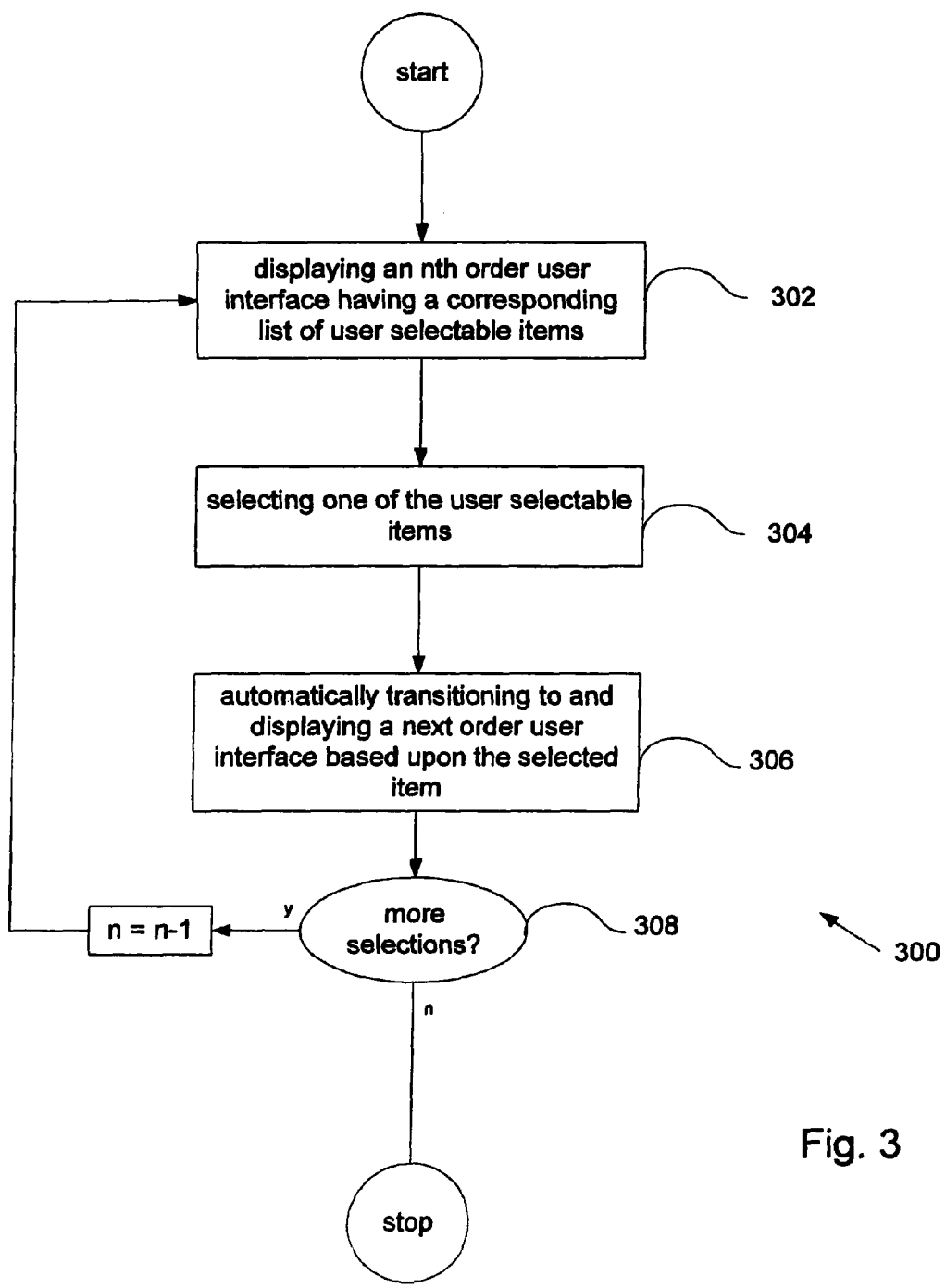
FIG. 3 shows a flowchart illustrating a particular process for selecting a particular one of a group of stored media assets in accordance with an embodiment of the invention.

FIG. 3 shows a flowchart 300 illustrating a particular process 300 for selecting a particular one of a group of stored media assets in accordance with an embodiment of the invention. Accordingly, at 302, a first order user interface is displayed having a list of first order user selectable items. In the example of FIG. 2, the first order user interface is the list of genres 202 whereas the first order user selectable items correspond to the various genres listed. Next, at 304, at least one of the user selectable items are selected. Subsequently, at 306, an automatic transition to and substantially simultaneous display of a lower order user interface corresponding to the selected item. At 308, a determination is made whether or not there are additional order user interfaces based upon the latest selected item. For example, from FIG. 2 above, selection of the Rock genre from the list 202 initiates the automatic transition to the lower order user interface and substantially simultaneous display of the list of ROCK artists 204a. This process continues until a lowest order interface (i.e., the Play Song display 210) is reached at which point the selection process ends and the selected multimedia asset is played.

Figure 4:
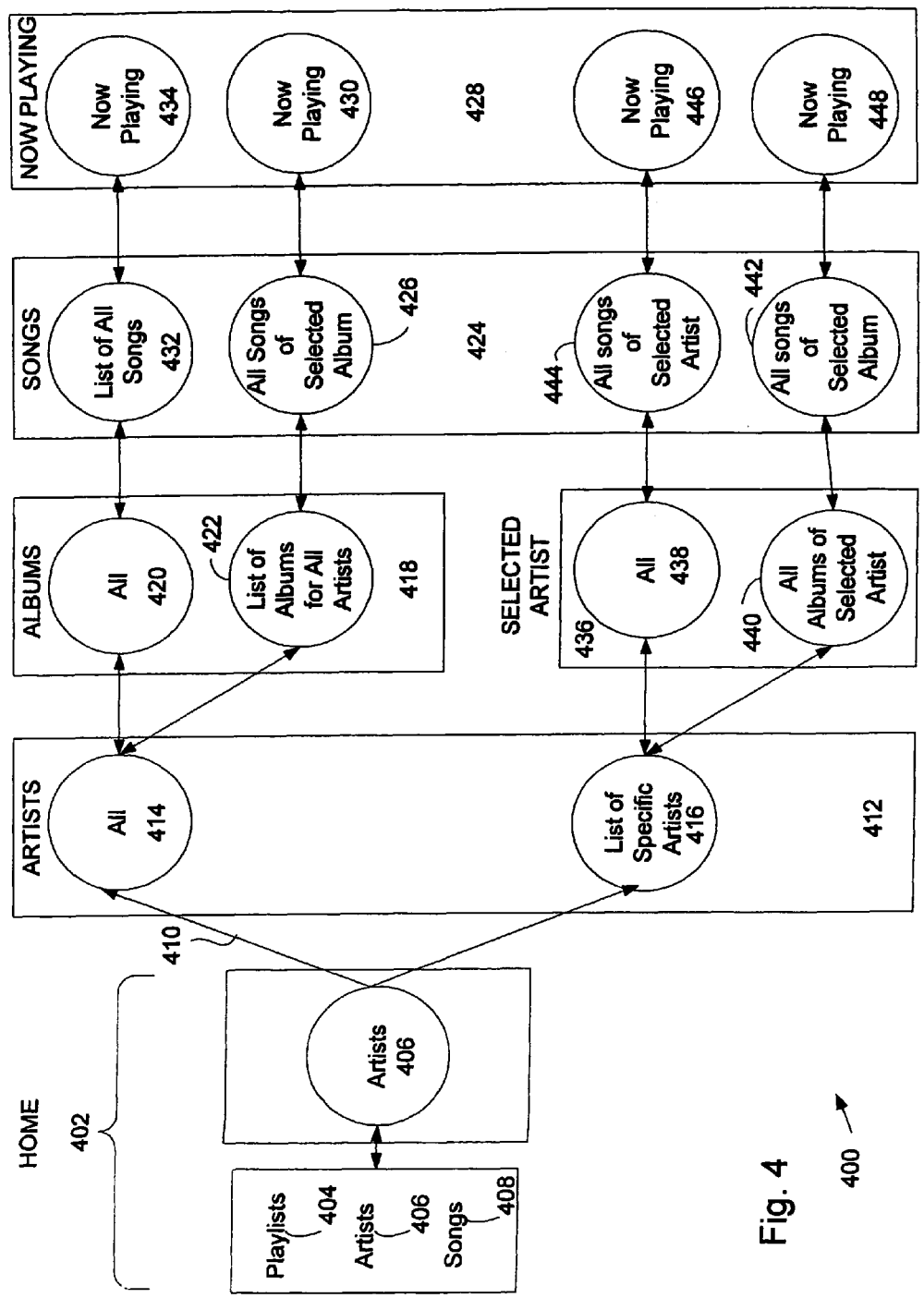
FIG. 4 shows a state diagram of a user interface suitable for providing user provided input for an exemplary MP3 player (along the lines of the player shown in FIG. 1) in accordance with an embodiment of the invention.

FIG. 4 shows a state diagram 400 of a user interface suitable for providing user provided input for an exemplary media player (along the lines of the player 100) in accordance with an embodiment of the invention. It should be noted that for sake of simplicity, only a single selection path is shown corresponding to a single selection item (i.e., Artists). Accordingly, a home interface 402 provides a list that includes a PLAYLIST item 404, an ARTISTS item 406, and a SONGS item 408 each of which is selectable by a user. It should be noted that each item is associated with a particular grouping of the multimedia assets (which in this example are audio files) stored at least in the file system 104. For example, the PLAYLIST item 404 is associated with a number of customizable playlists (i.e., a compendium of artists, songs, albums, etc. in any order and grouping as deemed appropriate) whereas the ARTISTS item 406 is associated with particular artists whose songs are stored in the file system 104 and so on.

Therefore, once a user selects either the PLAYLIST item 404, the ARTISTS item 406, or the SONGS item 408, an automatic transition to a lower order user interface occurs corresponding to the selected item. For example, if the user selects the ARTISTS item 406, an automatic transition 410 to the ARTISTS user interface 412 occurs where an ALL item 414 (associated with all artists) and a list of specific artists 416 are concurrently displayed. It should be noted that, although not shown, if the user had selected a particular song from the list of songs associated with the SONGS item 408, then the display would automatically transition directly to a now playing interface (not shown) indicating that the selected song is playing (or is prepared to be played) along with any other data or information deemed appropriate.

Once in the ARTISTS user interface 412, the user has the option of selecting a particular artist by selecting a desired artist from the list of specific artists 416 or selecting all artists by invoking the ALL item 414. For example, if the user selects all artists by invoking the ALL item 414, an automatic transition to a lower order ALBUMS interface 418 occurs where an ALL item 420 corresponding to all songs of all artists and a list of specific albums for all artists 422 are concurrently displayed. If, for example, the user selected a specific album from the list of specific albums 422, then an automatic transition to a still lower order interface ALL SONGS 424 occurs that displays a list of all songs of the selected album 426. At this point, when the user selects a particular song, an automatic transition to a now playing interface 428 occurs having a song information display 430 consistent with the selected song.

If, on the other hand, had the user had invoked the ALL item 420 in the ALBUMS interface 418, then songs interface 424 would display a list of all songs 432 of all the artists. At this point, the user could select a particular song from the list of all songs 432 resulting in an automatic transition to the now playing interface 428 having a song information display 434 consistent with the selected song.

A similar procedure can be followed in the case where instead of invoking the ALL item 414, the user had selected a particular artist from the list of artists 416. In this case, the act of selecting a particular artist initiates an automatic transition to a selected artist interface 436 that includes an ALL item 438 that points to all songs of the selected artist stored in the media player and a list of all albums of the selected artist 440 that are stored in the media player. Selecting one of the albums from the list of albums 440 results in an automatic transition to the songs interface 424 that includes a list of all songs associated with the selected album 442. On the other hand, invoking the ALL item 438 results in an automatic transition to the songs interface 424 having a list of all songs of the selected artist 444. Once in the songs interface 424, the user is free to select any song listed resulting in an automatic transition to the now playing interface 428. For example, selecting one of the songs listed in list of all songs of selected artist 444 or from the list of all songs of selected album 442 results in an automatic transition to the now playing interface 428 simultaneously with the display of song information displays 446 and 448, respectively.

It should be noted that the procedure described above is pathwise bi-directional in that the user can go in either direction along a selected path. It should be further noted, that in some embodiments, it is desirable to directly transition from the now playing interface 428 to the home interface 402 (and vice-versa) without displaying any of the intervening interfaces.

Figure 5A:
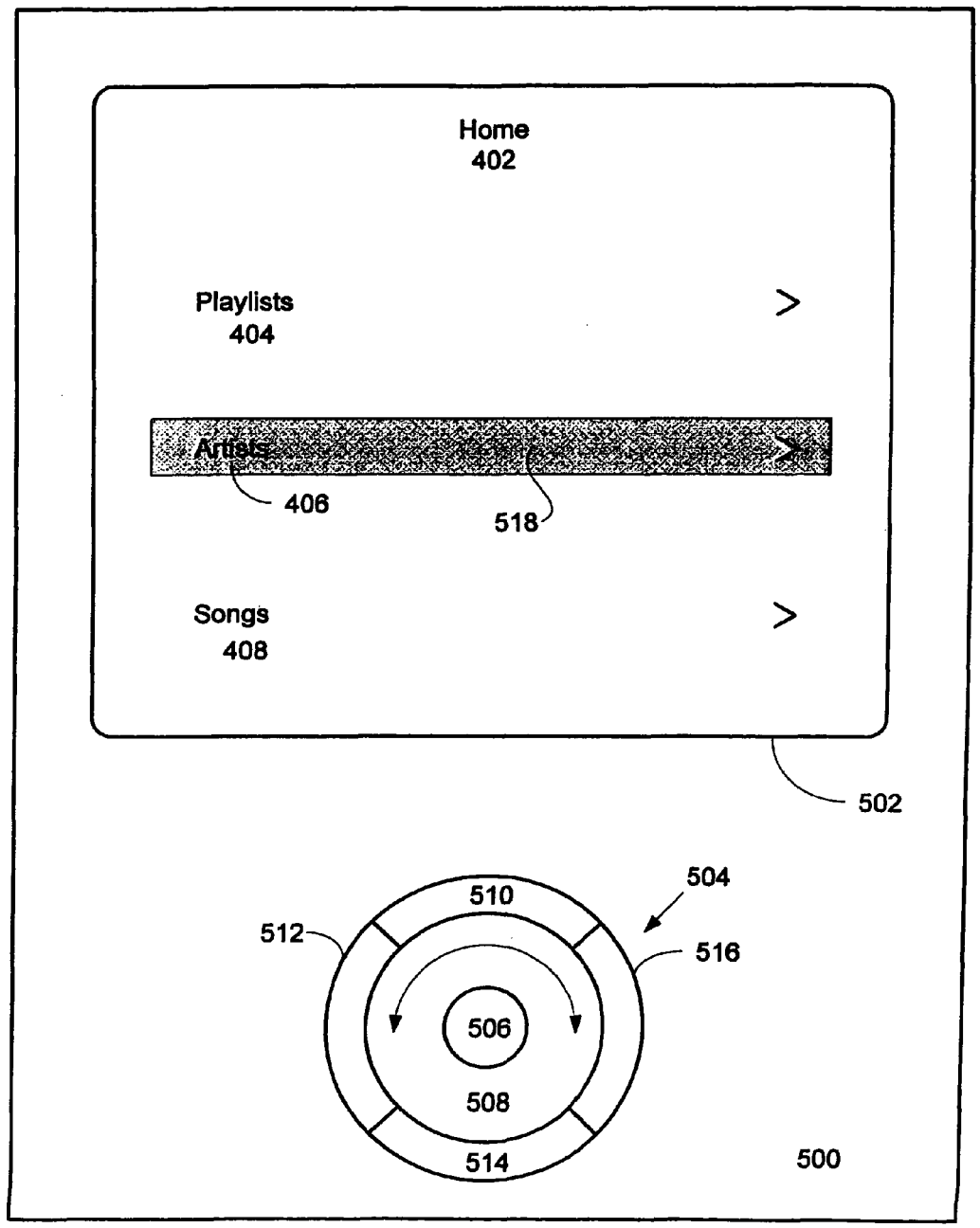
FIGS. 5A-5E illustrate various exemplary user interfaces consistent with selection and play of a media asset in accordance with an embodiment of the invention.
Figure 5B:
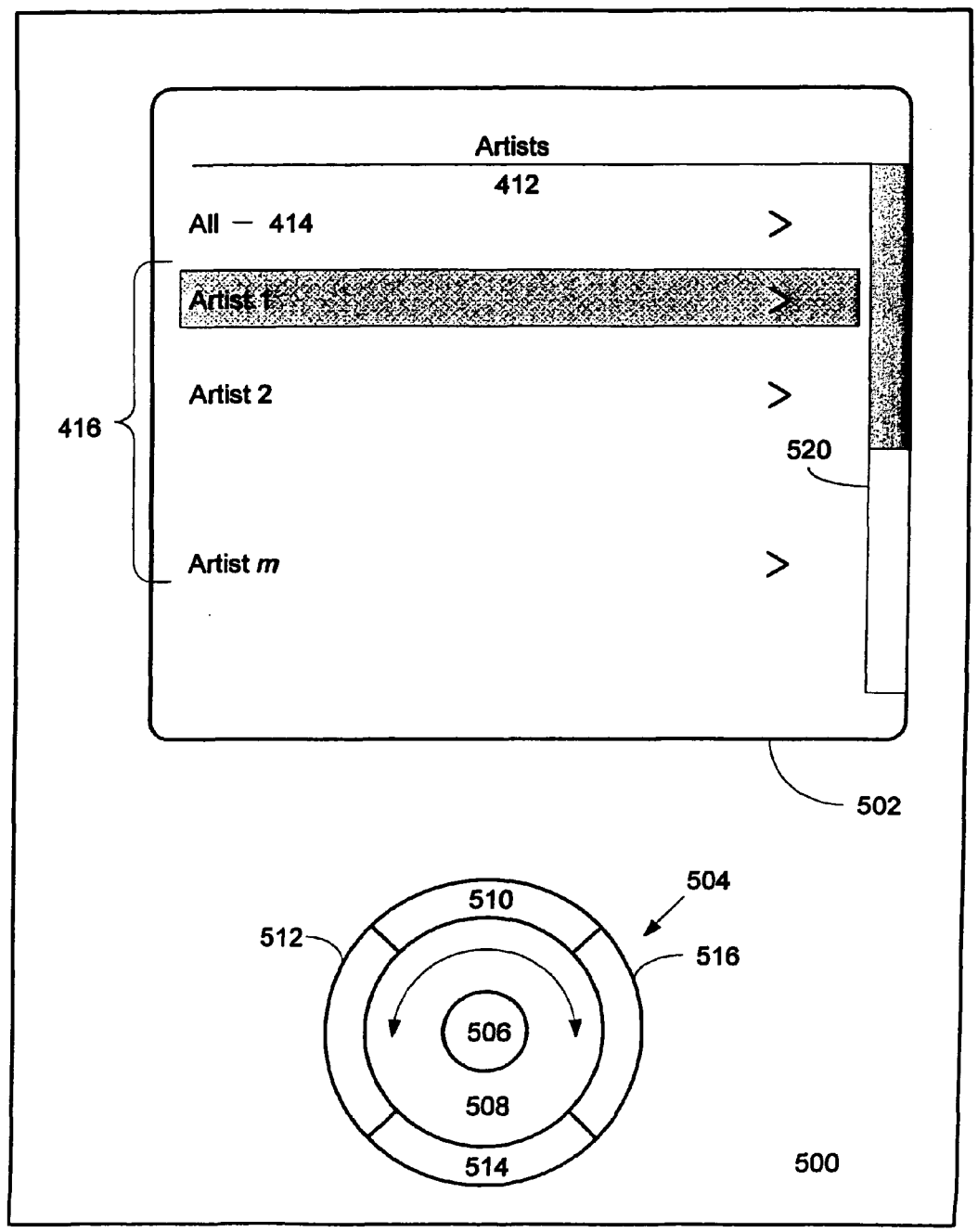
Figure 5C:
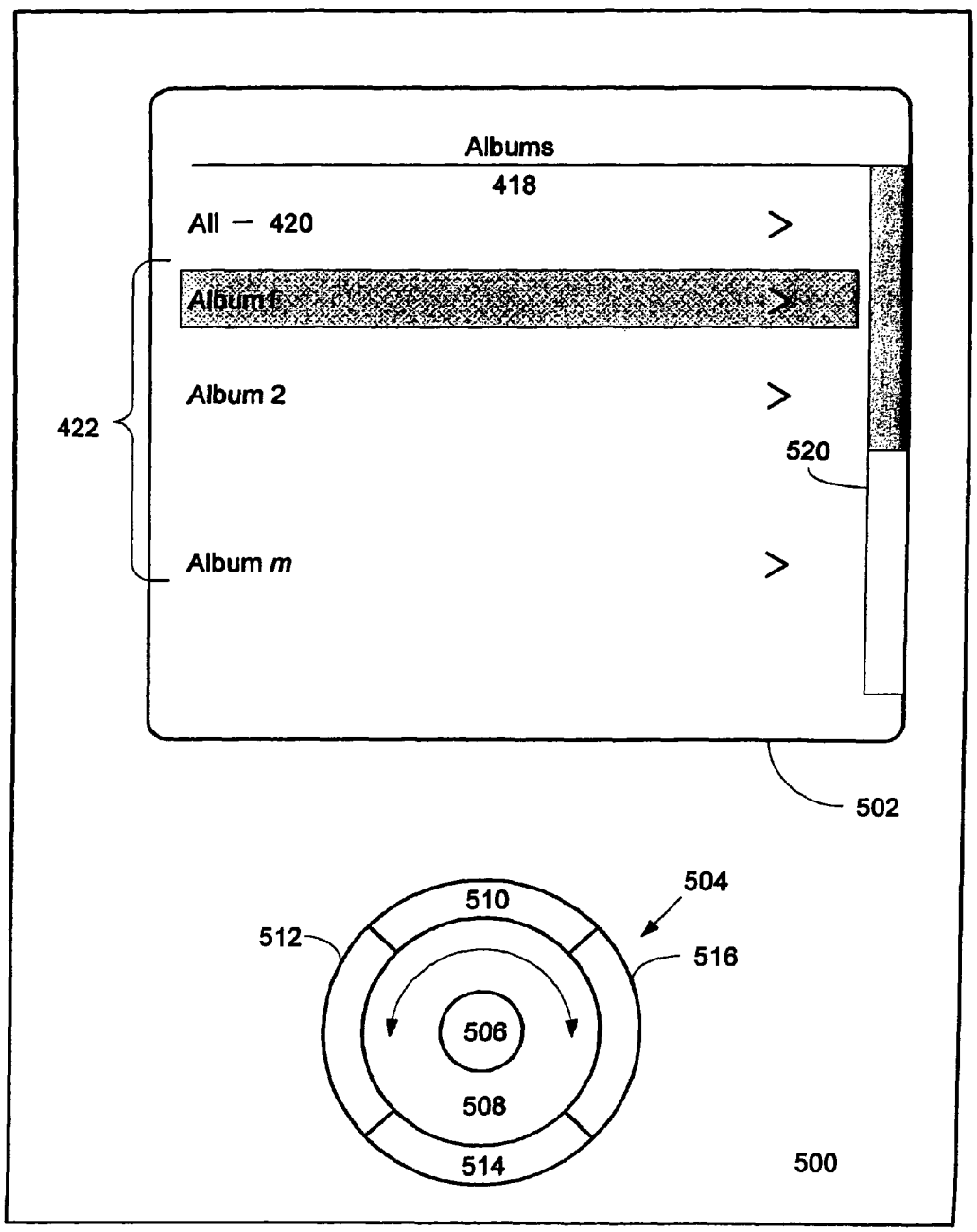
Figure 5D:
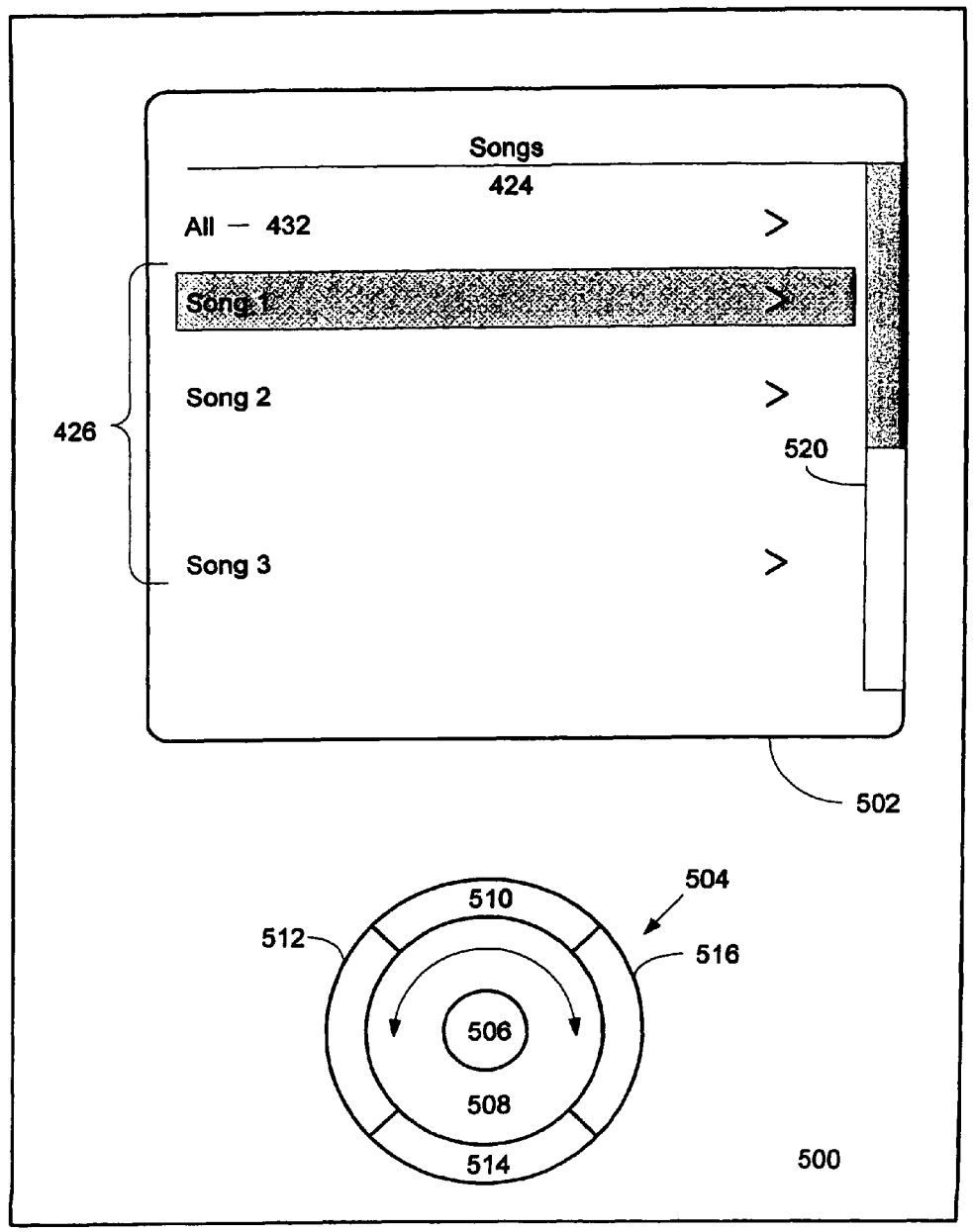
Figure 5E:
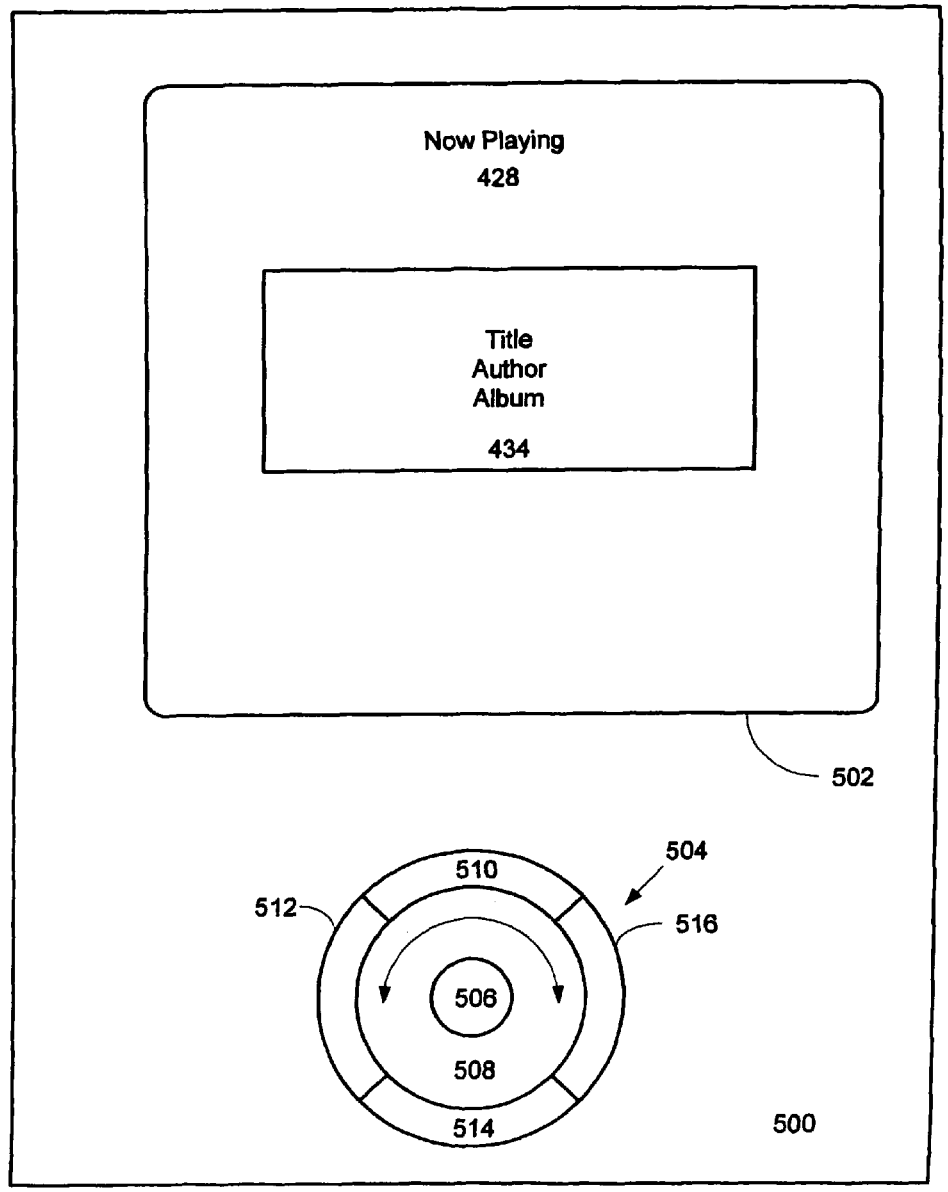

FIGS. 5A-5E illustrate various exemplary user interfaces consistent with selection and play of a media asset in accordance with an embodiment of the invention. One should note that the various user interfaces illustrated in FIGS. 5A-5E correspond to particular embodiments of the HOME interface 402, the ARTISTS interface 412, the ALBUMS interface 418, the SONGS interface 424, and the NOW PLAYING interface 428 described above. Accordingly, it should be further noted that each of the interfaces described are incorporated into a representative media player 500 having a display 502 and a user input device 504 that includes a central button 506, a selector wheel 508, and selectors 510-516. It is well to note that in this particular embodiment, the selectors 510-516 are a back up one level 510, a rewind 512, a play/pause 514, and a fast forward 516. Accordingly, FIG. 5A shows a particular implementation of the HOME interface 402 displayed on the display 502. In order to select the ARTISTS item 406, the user rotates selector wheel 508 in either a clockwise or counterclockwise direction (or any appropriate combination thereof) until the ARTISTS item 406 is rendered selectable (as noted by a semi-transparent highlight bar 518). Once the desired item is highlighted, the user selects the highlighted item by invoking a selection protocol by, for example, pressing the central button 506. Once selected, the HOME interface 402 immediately transitions to the ARTISTS interface 412 as shown in FIG. 5B. As with the selection in the HOME interface 402 of the ARTISTS item 406, a particular artist (or all artists) is selected by manipulating any of the user input devices 504 (such as the selector wheel 508) in combination with an appropriate selection event which can include pressing the central button 506. In this way, the user is provided the capability of navigating the user input menu in any manner that the user deems to be most convenient and efficient. It should be noted that a stack indicator bar 520 indicates the relative position of the selected item in relation to the stack of items associated with the particular selected group. Accordingly, FIGS. 5C-5E show various exemplary user interfaces consistent with the described embodiment of the invention.

Figure 6:
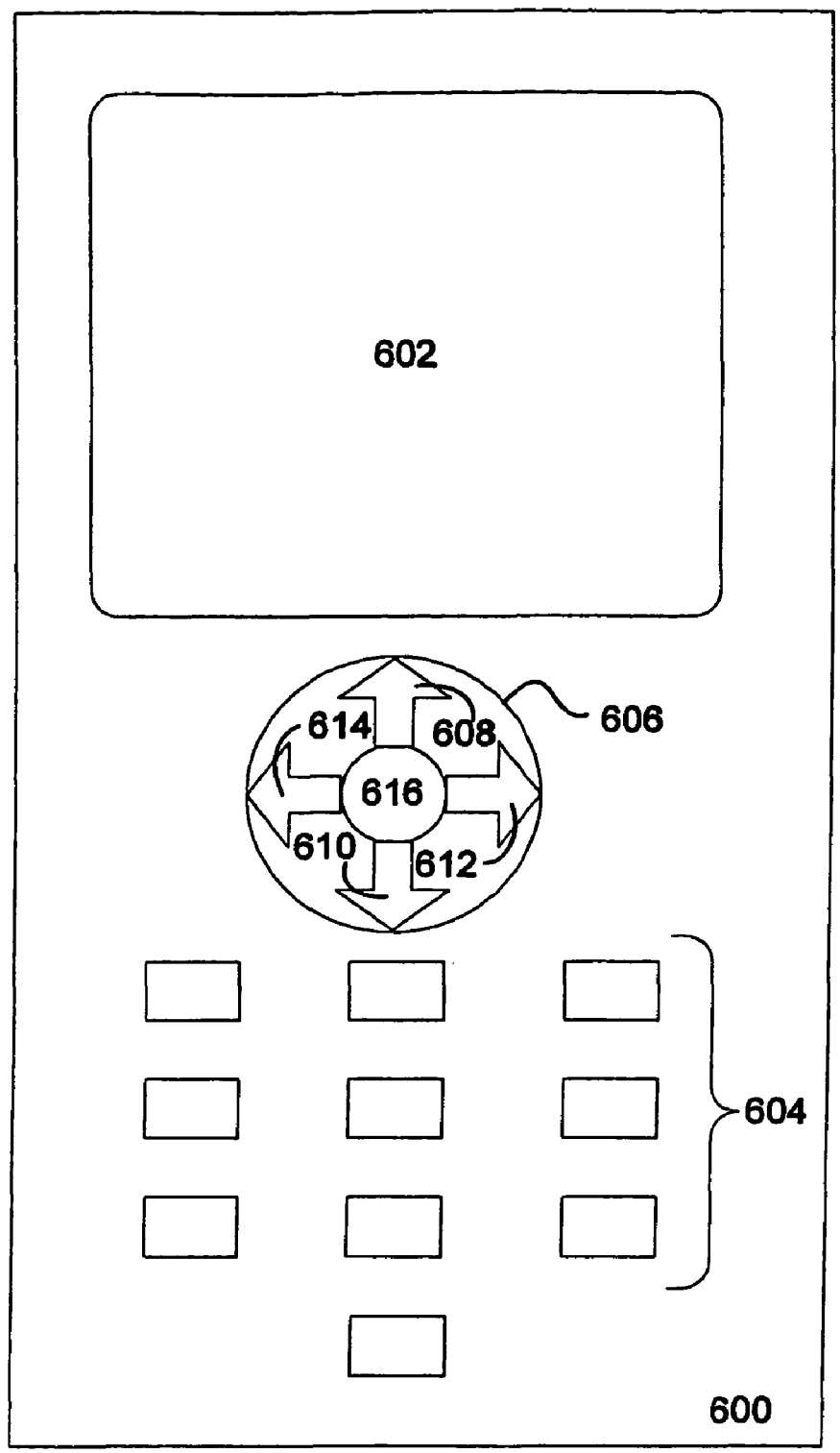
FIG. 6 is a cell phone as an exemplary wireless communication device in accordance with the invention.

In yet other embodiments, the personal communication device takes the form of a wireless communication device such as a cell phone (mobile phone), PDA, or other such device. One example of a personal communication device is a cell phone 600 illustrated in FIG. 6. The cell phone 600 includes a display 602 suitable for displaying any of a number of icons (not shown) useful for providing information to a user, a number of input keys 604 (which in this case represent telephonic input characters useful for telephone dialing, text messaging, etc.) and a navigation tool 606 that provides a user the ability to navigate amongst the displayed icons. For example, a user can use the navigation tool 606 to search for and display previously dialed telephone numbers. In the described embodiment, the navigation tool 606 includes any of a number of navigation input devices such as an up-pointer 608, a down pointer 610, a right pointer 612, and a left pointer 614 each of which provides a corresponding navigation instruction to the cell phone 600 that translates into a particular observable action on the display 602. A selector 616 provides for a user to select a designated (e.g., highlighted) icon.

Figure 7:
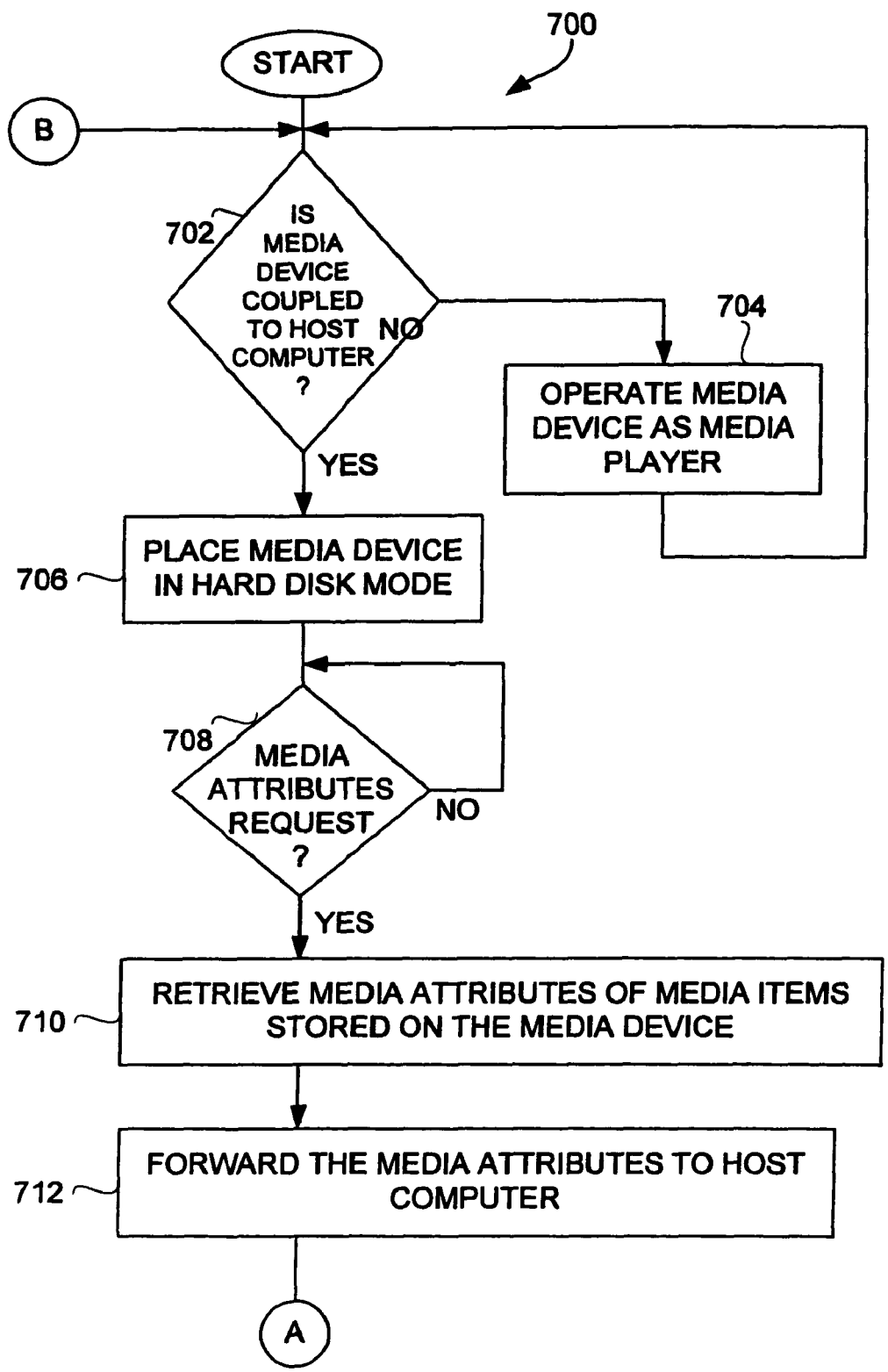
FIGS. 7 and 8 is a flow diagram of synchronization processing according to one embodiment of the invention.
Figure 8:
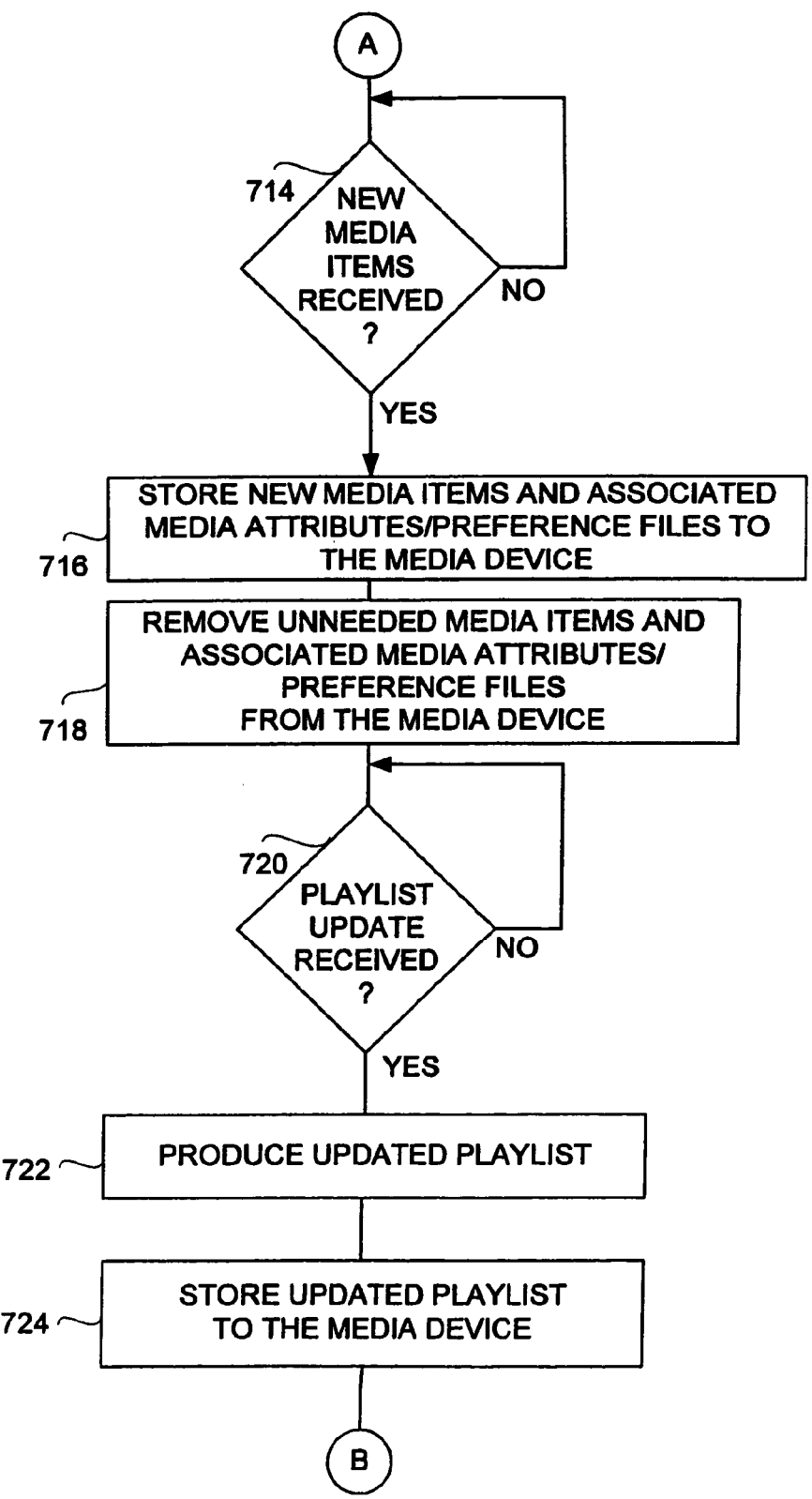

When used as a cell phone, any number of useful personal data files can be loaded into a memory device (not shown) incorporated into the cell phone 600 for later retrieval and access by a user. It should be noted, however, that other embodiments, the wireless communication device can be used as a multimedia player in much the same manner described above. However, in particularly useful embodiments, the wireless communication device can provide the functionality of the cell phone as well as provide for the storage and playback of multimedia asset files, such as AAC or MP3 files. In this case, the cell phone/multimedia player wirelessly synchronizes with a remote server. In some cases, the cell phone/multimedia player 600 will periodically wirelessly synchronize to a host computer (e.g., personal computer) as shown in FIGS. 7 and 8 that show a flow diagram of synchronization processing 700 according to one embodiment of the invention. The synchronization processing 700 is, for example, performed by a host computer that connects to the wireless communication device over a wired or wireless data link. The media device synchronization processing 700 is performed by a media device that interacts with a host computer over a network. For example, the media device can pertain to the media player 100 illustrated in FIG. 1.

As shown in FIG. 7, the media device synchronization processing 700 is generally operative on the media device when the media device is powered-on. Initially, a decision 702 determines whether the media device has just been coupled to the host computer. When the media device is a wireless communication device, the wireless communication device can couple to the host computer via a wireless network. When the decision 702 determines that the media device has not just been coupled to host computer, then the media device is operated 704 as a media player. In such a mode, the media device operates to browse, search or play media items for its user. The media items can be audio items (e.g., songs). Following the operation 704, the media device synchronization processing 700 returns to repeat the decision 702 and subsequent operations.

On the other hand, when the decision 702 determines that the media device has just been coupled to the host computer, then the media device is placed in a hard disk mode 706. In the hard disk mode, the media device acts as an external hard drive to the host computer. A decision 708 then determines whether the host computer has requested media and or programmable button attributes for the media items residing on the media device. When the decision 708 determines that the host computer is not requesting media and or programmable button attributes, the media device can, but need not, perform other hard drive operations for non-synchronization purposes (not shown). When the decision 708 determines that the host computer is requesting media and or programmable button attributes (i.e., such as through a read operation), then the media and or programmable button attributes of the media items stored on the media device are retrieved 710. After the media and or programmable button attributes are retrieved 710, the media attributes are forwarded 712 to the host computer.

Referring now to FIG. 8, a decision 714 determines whether new and or media file attributes have been received at the media device from the host computer. In other words, in an effort to synchronize the media content and or media attributes residing on the media device with the media content residing at the host computer, the media device will often receive media content from the host computer. Hence, the decision 714 determines whether new media items have been or are presently being received. When the decision 714 determines that such new media items have not been received, then the media device synchronization processing 700 can await such new media items. While waiting for new media items, the media device can, but need not, perform other hard drive operations for non-synchronization purposes (not shown). More generally, other hard disk operations can occur concurrently with synchronization operations. On the other hand, when the decision 714 determines that new media items have been received from the host computer, then the new media items and their associated media attributes are stored 716 to the media device. In one embodiment, the new media items are stored to files in the media device, and the associated media attributes pertaining to the media items are stored in a media database residing on the media device. Additionally, any unneeded media items and their associated media attributes and or programmable button attributes can be removed 718 from the media device. Hence, in this embodiment, by synchronizing the media content residing on the media device with that on the host computer, new media items are not only stored to the media device, but unneeded (e.g., old) media items and their associated media attributes are also removed from the media device.

Following the operation 718, a decision 720 determines whether a play list update has been received. When the decision 720 determines that a play list update has not been received, then the media device synchronization processing 700 can await such a play list update. Alternatively, when the decision 720 determines that a play list update has been received, then an updated play list for the media device is produced 722. The play list update could be the updated play list or could be instructions to update an existing play list. The updated play list is then stored 722 to the media device.

In effect, one or more play lists at the host computer can be synchronized with the media device and thus made available to the media device. A play list identifies particular media items that are to be played in a sequence. Internally, the play list can be represented in the media database as a data structure that points to files of the appropriate media items residing on the storage device within the media device. Hence, for a given play list, the pointers to the files of the appropriate media items on the media device can differ from the pointers to the files for the same media items on the host computer, thus the need to update the pointers if a particular play list is moved between the host computer and the media device.

Once the wireless communication device (e.g., cell phone 600) is properly synchronized, a user has the option of selecting any of a number of audio files stored therein. In order to facilitate this selection process, a hierarchically ordered graphical user interface can be presented on a display (e.g., the display 602) having, in one embodiment, a form illustrated in FIGS. 9-27. It should be noted that for the remainder of this discussion, the wireless communication device is assumed to have a number of audio (i.e., music and song) files stored therein. In this way, the wireless communication device can be a cell phone/media player combination device, or any other device arranged in a like manner.

Accordingly, FIGS. 9A-9C show a main menu screen 900, 904 and 906, respectively, each being associated with a particular operational state (i.e., stopped in FIG. 9A, playing in FIG. 9B, or paused in FIG. 9C) of a wireless communication device. In general, the main menu screen is the home screen of a graphical user interface from which a user can view, at least, a master playlist, a list of artists, a list of albums, and a list of songs in a library of audio files stored in the wireless communication device. The main menu screens can also enable the user to request operations. For example, the main menu screen 902 includes a "shuffle songs" item in the graphical user interface, which if selected causes a shuffle operation. As another example, the main menu screens 904 and 906 include a "Now Playing" item in the graphical user interface, which, if selected, causes display of media attribute information for a media item being played. In addition to the above list of stored data, the various screens provide one or more soft key functions. The soft key functions can include an EXIT icon, a play icon, and a pause icon depending upon the corresponding operational state of the personal communication device.

Figure 10:
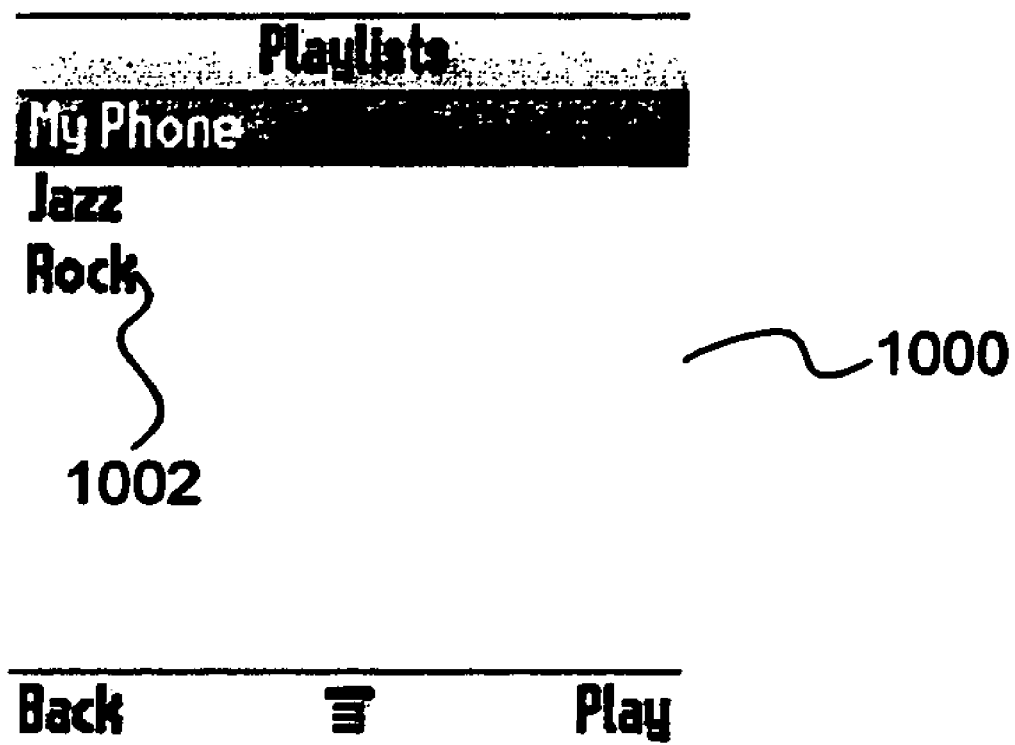
FIG. 10 shows a particular example of a playlists screen in accordance with an embodiment of the invention.

FIG. 10 shows a particular example of a playlists screen 1000 in accordance with an embodiment of the invention. In the example shown in FIG. 10, the playlists screen 1000 displays the names of all the playlists that have been added to the wireless communication device including and starting with a master playlist 1002, that includes all the tracks stored in the wireless communication device. From the playlists screen 1000, the user can view the tracks in a playlist or start playing the first track in a playlist.

Figure 11:
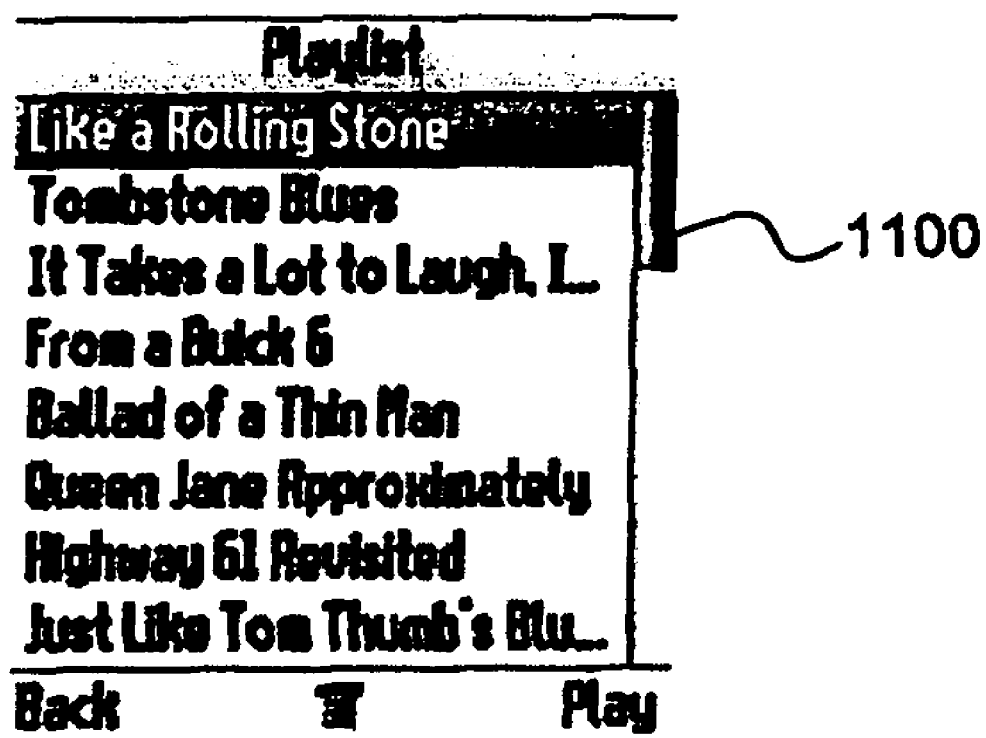
FIG. 11 shows a particular example of a playlist screen in accordance with an embodiment of the invention.

FIG. 11 shows a particular example of a playlist screen 1100 in accordance with an embodiment of the invention. The playlist screen displays the names of the tracks in the current playlist in the order in which they will be played. The user can arrange the order of the tracks in the playlist as desired.

Figure 12:
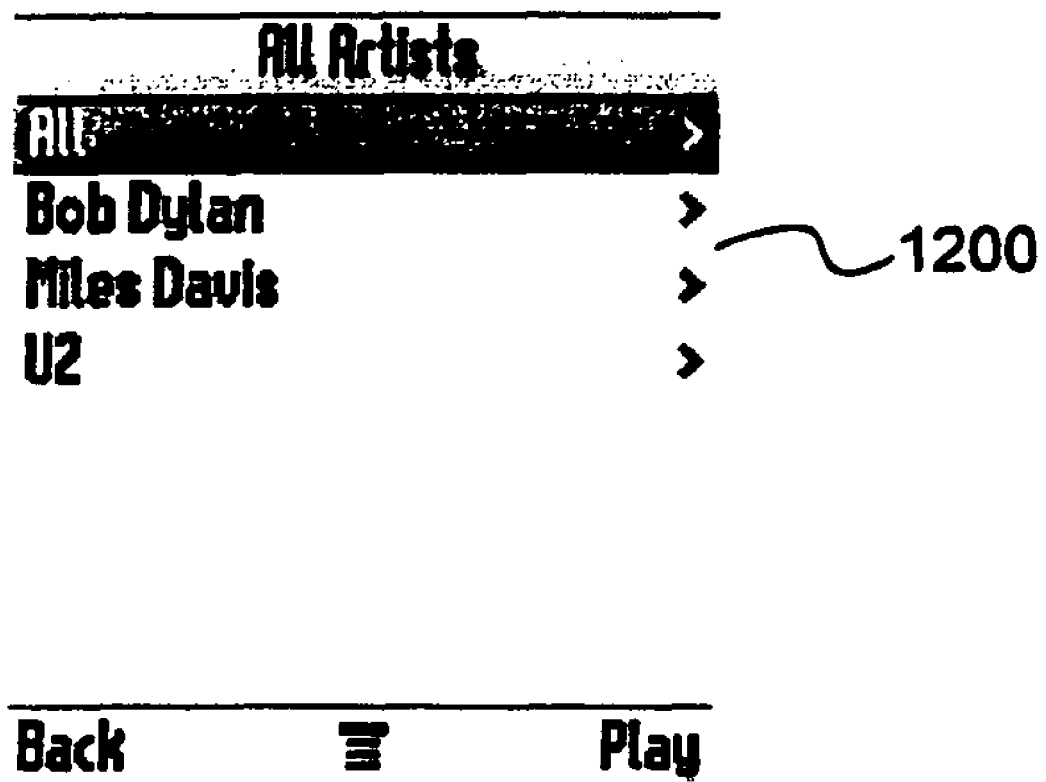
FIG. 12 shows a particular example of an artists screen in accordance with an embodiment of the invention.

FIG. 12 shows a particular example of an artists screen 1200 in accordance with an embodiment of the invention. The artists screen 1200 displays a list of all the artists stored in the wireless communication device in any appropriate order, such as alphabetical. From the artists screen 1200, the user can view all the albums by an artist or start playing all the tracks by an artist.

Figure 13:
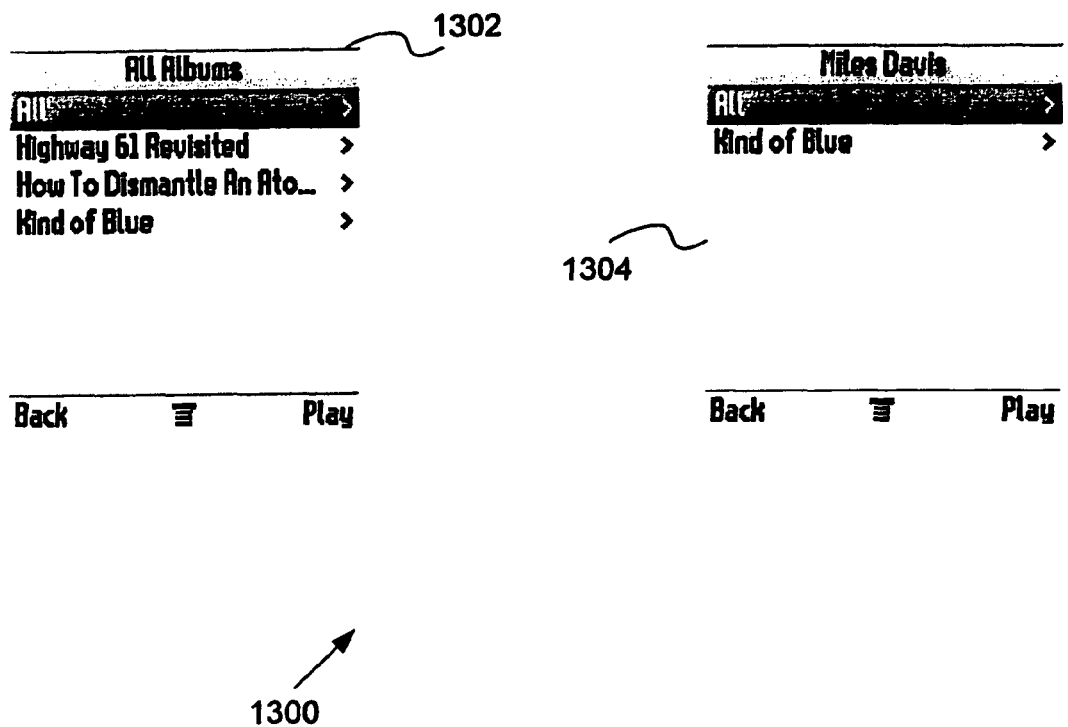
FIG. 13 shows a particular example of an albums screen in accordance with an embodiment of the invention.

FIG. 13 shows a particular example of an albums screen 1300 in accordance with an embodiment of the invention. The albums screen 1300 displays a list of the albums stored in the wireless communication device in any appropriate order, such as alphabetical or order set by user, or order added to the device. When entered from the main menu screen 900, all the albums stored in the wireless communication device are displayed in an all albums screen 1302. When entered from the artists screen 1200, the albums for the selected artist are displayed in a particular albums screen 1304. From the albums screen 1300, the user can view all the tracks in an album or start playing all the tracks in an album.

Figure 14:
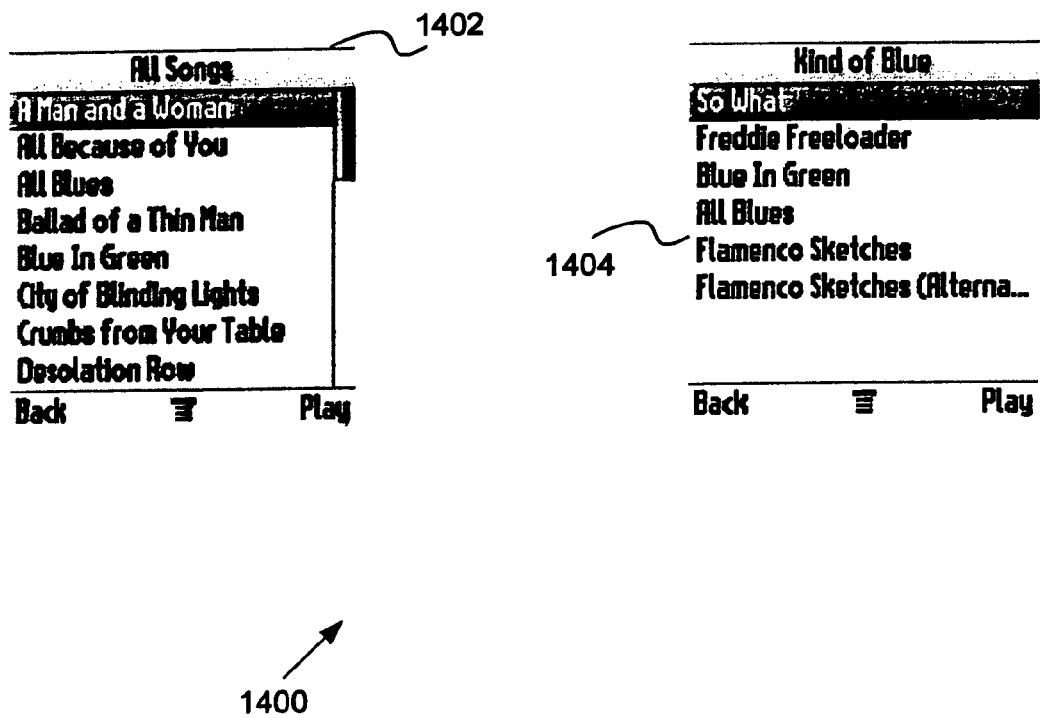
FIG. 14 shows a particular example of a songs screen in accordance with an embodiment of the invention.

FIG. 14 shows a particular example of a songs screen 1400 in accordance with an embodiment of the invention. The songs screen 1400 displays a list of track names in any appropriate order, such as alphabetical, or order set by user, or order added to the device. When entered from the main menu screen 900, all the tracks in the library are displayed in an all songs screen 1402. When entered from the albums screen 1300, the tracks for the selected album are displayed in a particular songs screen 1404.

Figure 15:
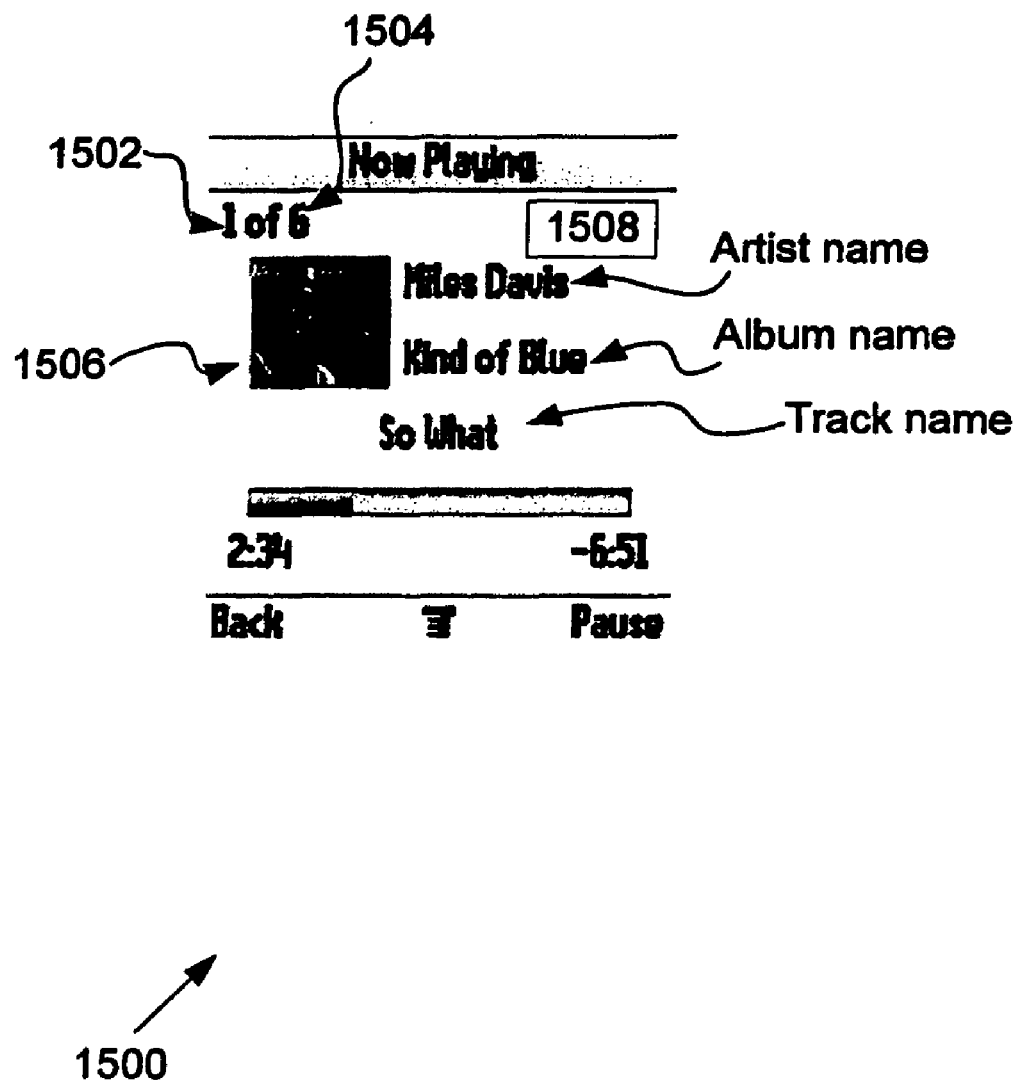
FIGS. 15-20 shows a particular example of a now playing screen in accordance with an embodiment of the invention.

FIGS. 15-20 shows a particular example of a now playing screen in accordance with an embodiment of the invention. As shown in FIG. 15, in general, the now playing screen displays metadata information for the track that is currently playing, along with playback progress information, and in particular displays an index 1502 of the current track in play order, and the total number 1504 of tracks in the play order. The metadata information includes artist, album, track name and any available album artwork image 1506. In the described embodiment, the track name scrolls horizontally if it is wider than the width of the screen. In addition, the repeat and shuffle settings for the current playlist are indicated by icons in the upper right corner (1508). In the described embodiment, the now playing screen has five modes each having a particular display screen: progress mode (progress mode screen 1600 in FIG. 16), artwork mode (artwork mode screen 1700 in FIG. 17), position mode (position mode screen 1800 in FIG. 18), rating mode (rating mode screen 1900 in FIG. 19), and volume mode (volume mode screen 2000 in FIG. 20).

Figure 16:
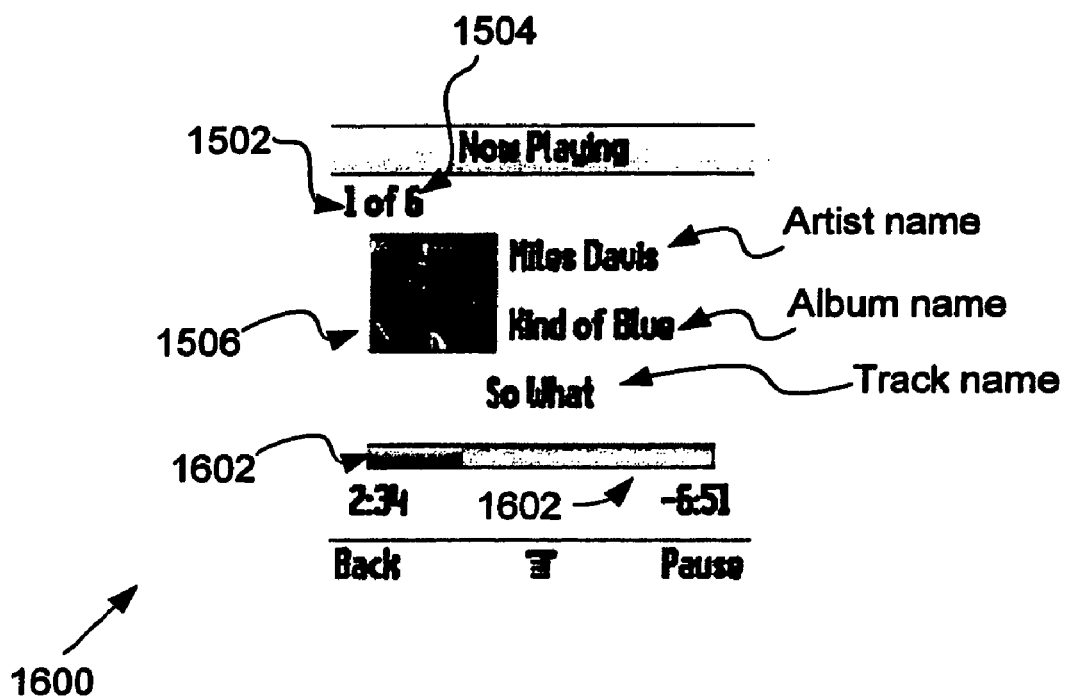
Figure 17:
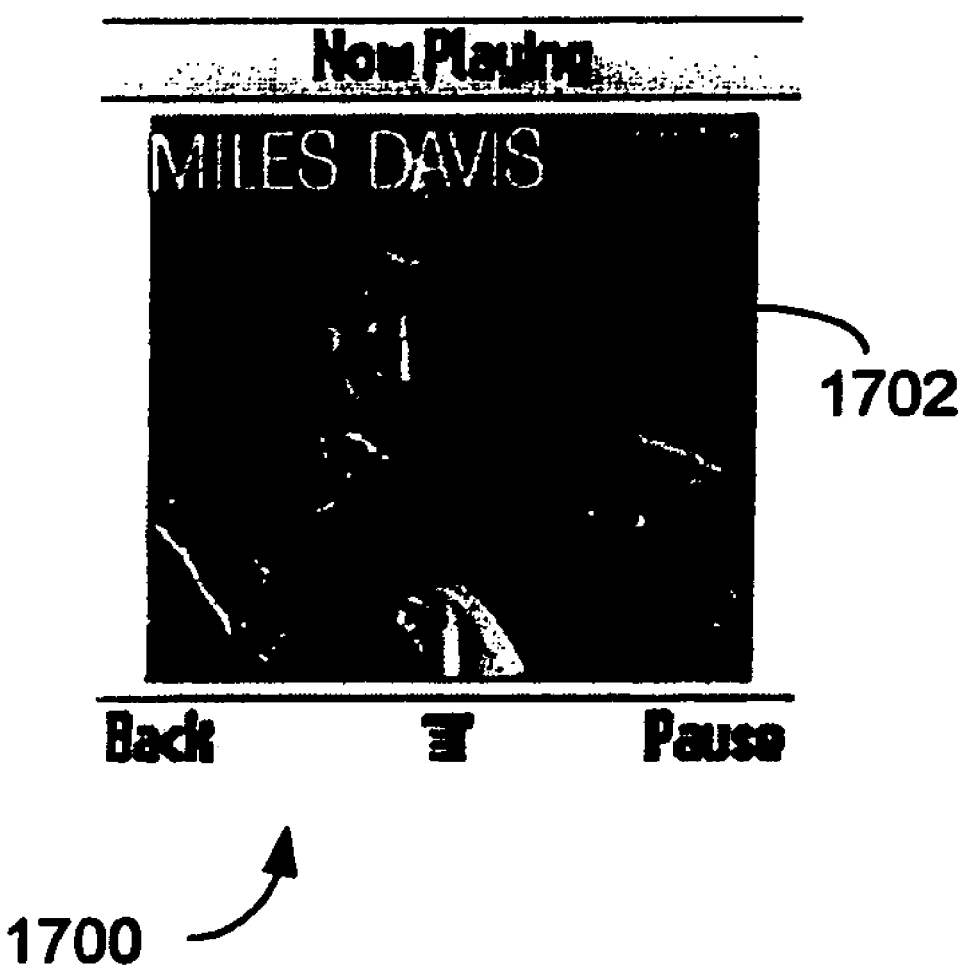
Figure 18:
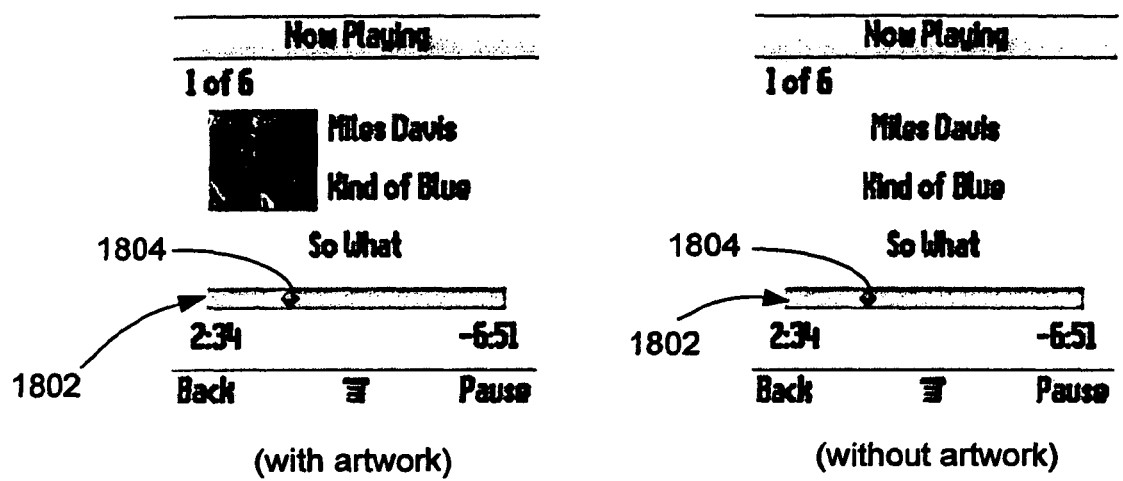
Figure 19:
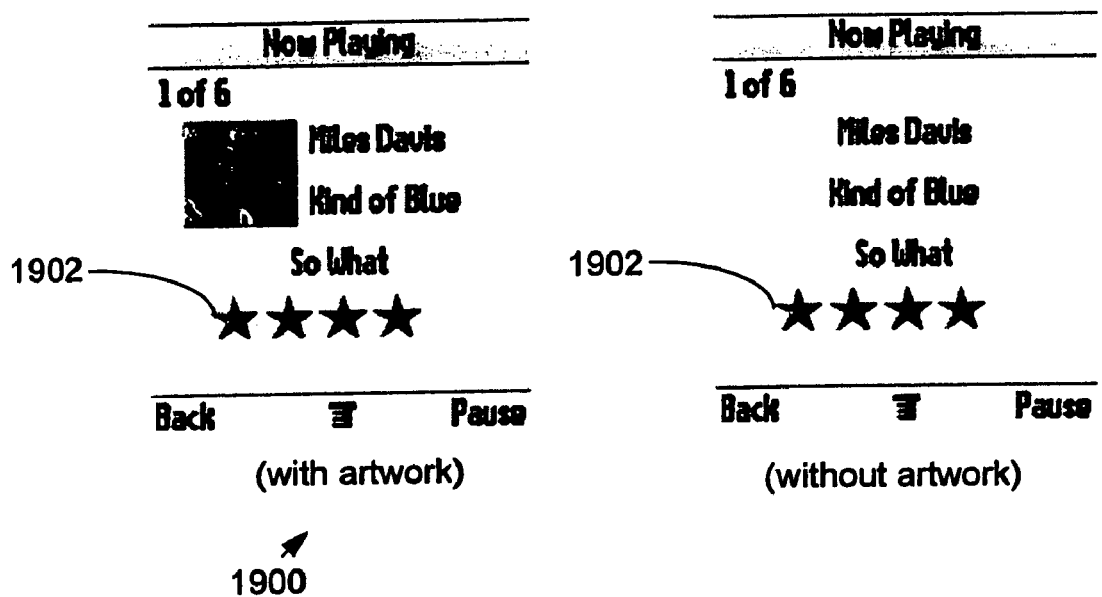
Figure 20:
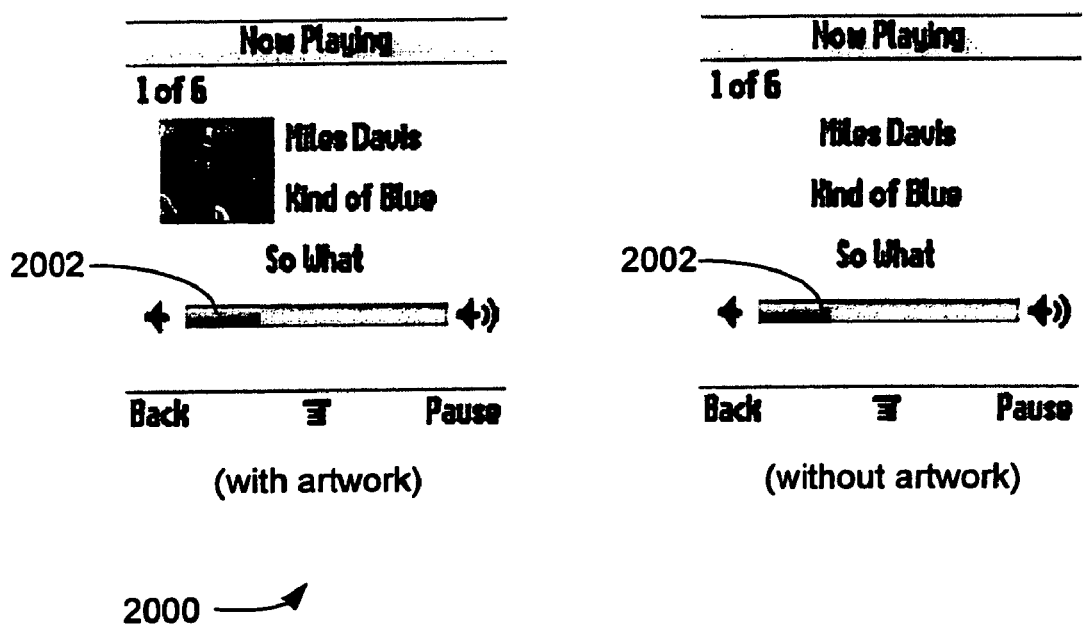

Referring to FIG. 16, in progress mode, the progress mode screen 1600 displays a progress bar 1602 with an elapsed time and a remaining time for the current track. In artwork mode (FIG. 17), the artwork mode screen 1700 a full screen album artwork image 1702 is displayed if artwork is available for the current track. In position mode (FIG. 18), the position mode screen 1800 (with or without artwork) displays a progress bar 1802 with a position indicator 1804 and allows the user to adjust the playback position with the current track. In rating mode (FIG. 19), the rating mode screen 1900 (with or without artwork) displays a user rating 1902 for the current track and may allow the user to adjust the rating. In volume mode (FIG. 20), the volume mode screen 2000 (with or without artwork) displays a current volume level 2002 of the player and allows the user to adjust the volume level.

Figure 21:
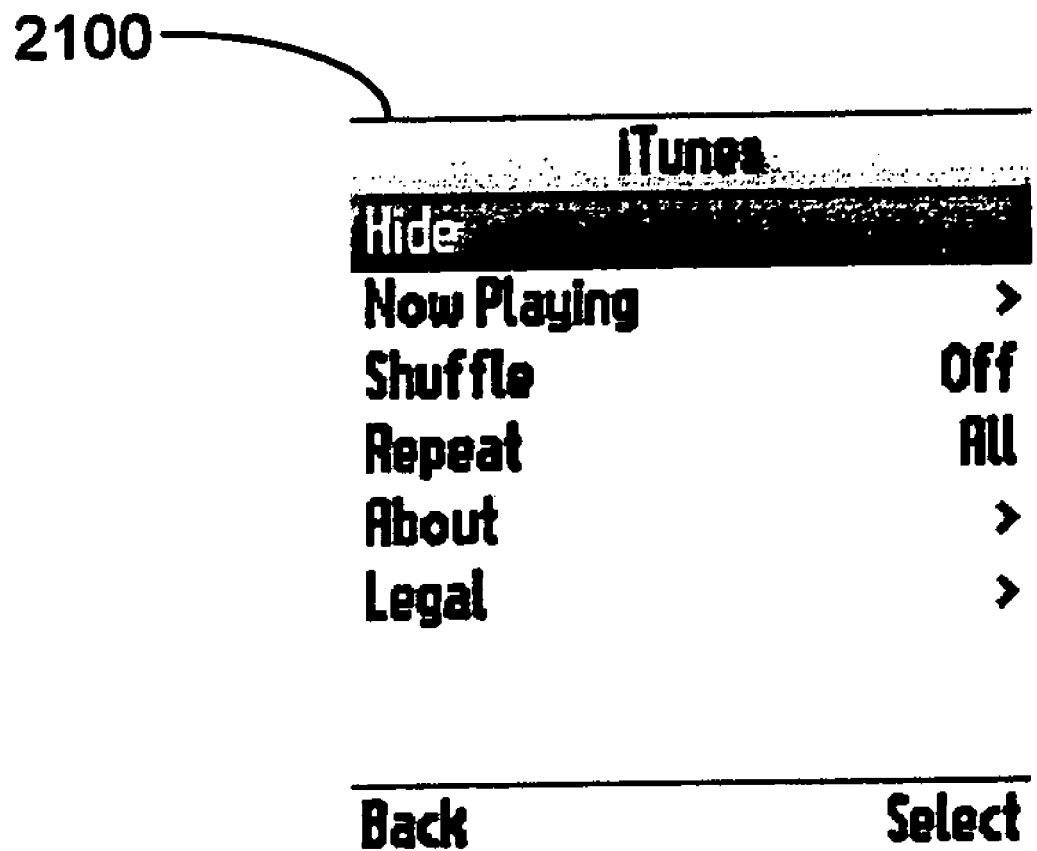
FIG. 21 shows a contextual menu in accordance with an embodiment of the invention.

FIG. 21 shows a contextual menu screen 2100 in accordance with an embodiment of the invention. The contextual menu screen 2100 is a screen that can be accessed via a soft key to display infrequently used preferences, settings or information.

Figure 22:
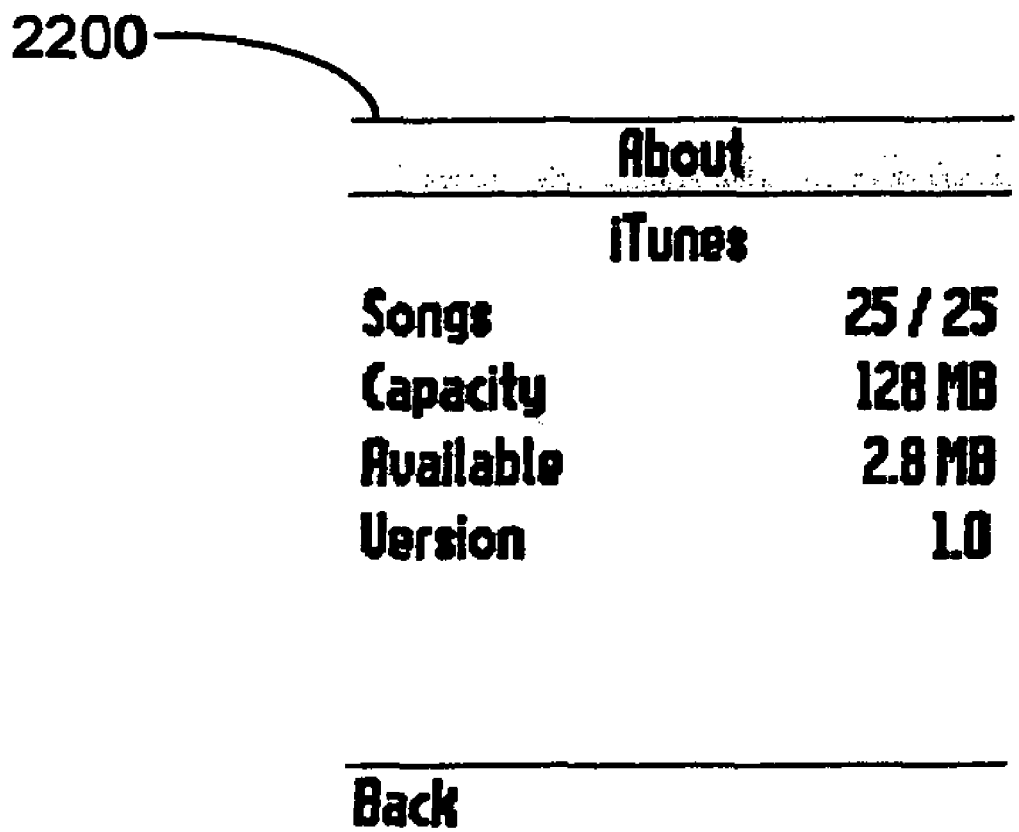
FIG. 22 shows an about screen in accordance with an embodiment of the invention.

FIG. 22 shows an about screen 2200 in accordance with an embodiment of the invention. The about screen 2200 displays statistical information that includes the total number of tracks in the library, the maximum number of tracks supported by the wireless communication device, the capacity of internal memory (such as a flash memory card), the available space in the internal memory, and the current version of a software application used on the wireless communication device.

Figure 23:
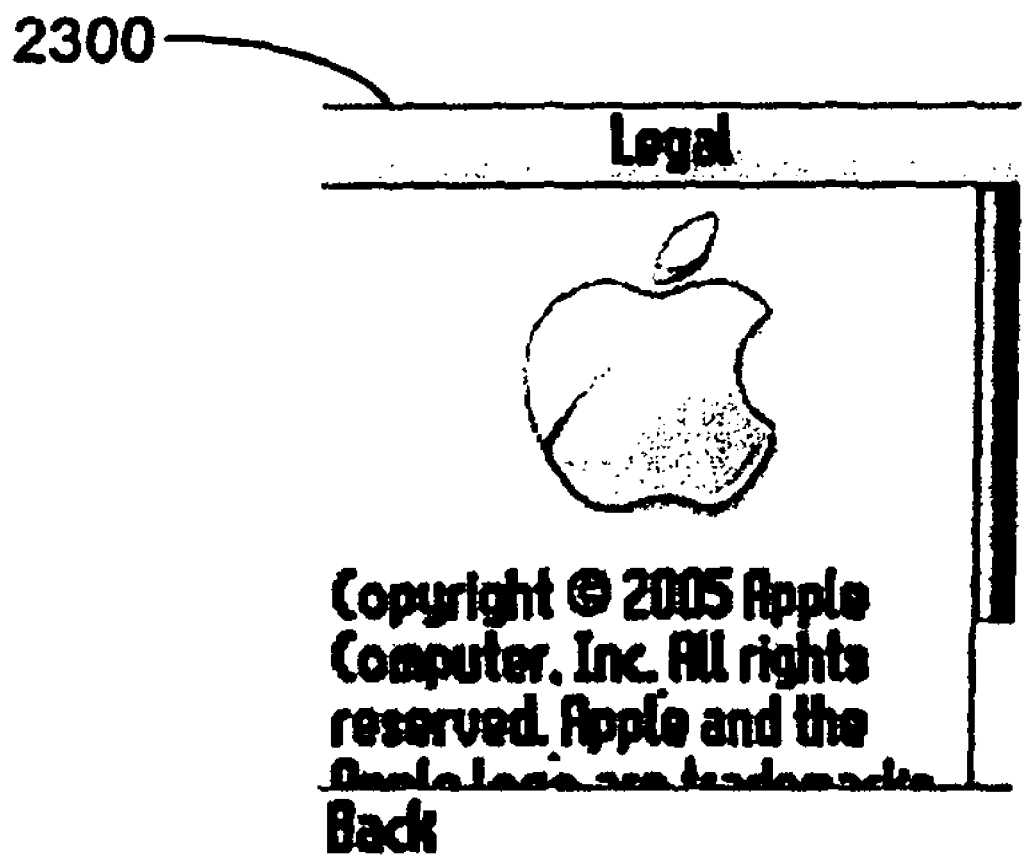
FIG. 23 shows a legal screen in accordance with an embodiment of the invention.

FIG. 23 shows a legal screen 2300 in accordance with an embodiment of the invention. The legal screen 2300 displays copyright and other legal information pertinent to the wireless communication device and any application thereon.

Figure 24:
FIGS. 24 and 25 shows a delete menu screen in accordance with an embodiment of the invention.

FIG. 24 shows a delete menu screen 2400 in accordance with an embodiment of the invention. The delete menu screen 2400 is displayed in what is referred to in the delete-ondownload mode. It allows the user to delete one or more tracks from the wireless communication device in order to free-up space on the internal memory for over the air downloaded content. The delete menu screen 2400 also indicates an amount of space needed.

Figure 25:
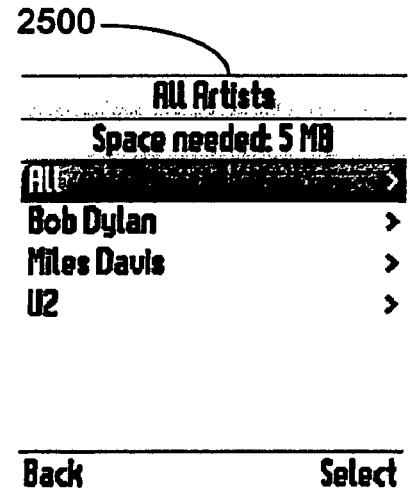

FIG. 25 shows a delete artists screen 2500 in accordance with an embodiment of the invention. The delete artists screen 2500 displays a list of all the artists stored in the wireless communication device and allows the user to view the albums for an artist or to delete all of the tracks for an artist on the wireless communication device. The delete artists screen 2500 also indicates an amount of space needed.

Figure 26:
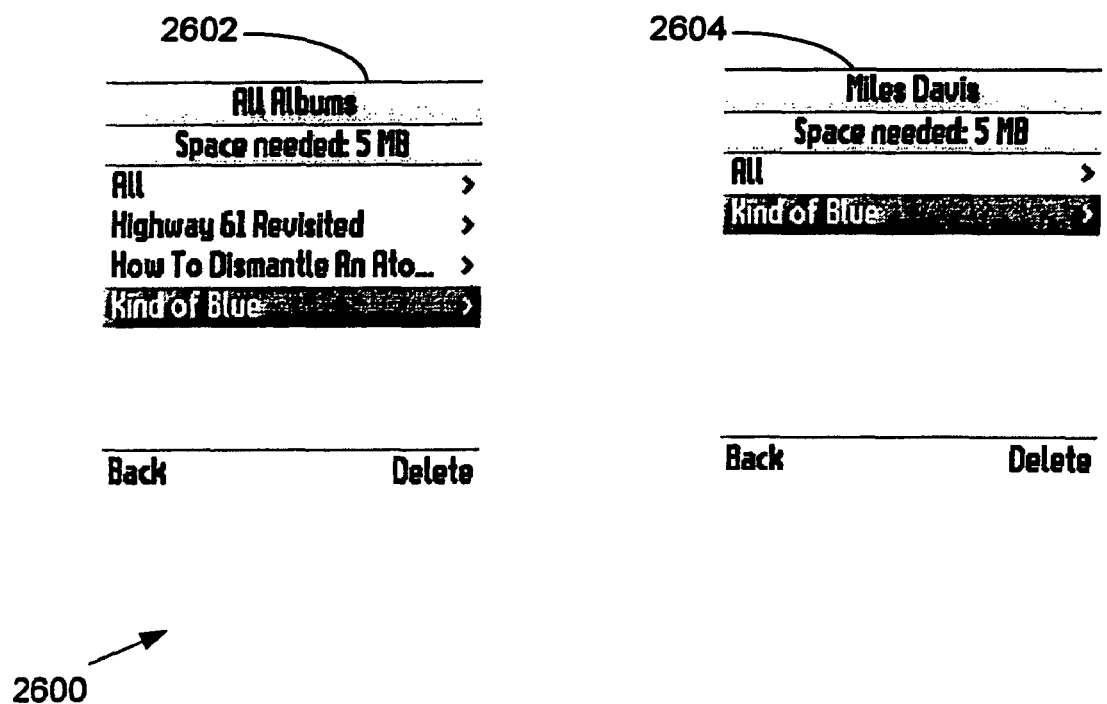
FIG. 26 shows a delete albums screen in accordance with an embodiment of the invention.

FIG. 26 shows delete albums screens 2600 in accordance with an embodiment of the invention. The delete albums screens 2600 displays a list of all the albums stored in the device and allows the user to view all the tracks in an album or to delete all the tracks in an album. When entered from the delete menu screen 2400, all the albums in the wireless communication device are displayed (2602). When entered from the delete artists screen 2500, the albums for the selected artist are displayed (2604).

FIG. 27 shows delete songs screens 2700 in accordance with an embodiment of the invention. The delete songs screens 2700 display the name and size of a list of tracks and allows the user to delete one or more songs from the library. When entered from the delete menu screen 2400, all the tracks are displayed (2702). Alternatively, when entered from the delete albums screen 2600, the tracks for the selected album are displayed (2704).

It should be noted that each of the display screens described herein provides a number of user activated icons whose functions are determined by the particular screen being displayed. For example, referring to FIG. 9A, in the stopped mode and the paused mode, the user activated icons include an exit icon, a soft key icon, and a play icon, whereas in the playing mode, the play icon is replaced with a pause icon. In addition, an acceleration feature whereby during a period of time in which a particular user input button, or key, having the acceleration feature is held down, the observed resulting action (such as moving a playback position forward, for example) can be accelerated in a predetermined manner. Using the example of moving the playback position, providing what is referred to as a long press input (i.e., holding a key down for a length of time greater than a predetermined threshold) to a forward hard key results in moving the playback position forward starting in pre-determined time intervals increments (such as 5 seconds) and accelerating in larger time interval increments while the playback position key is being held down. In some embodiments, after a period of time, the mode switches to another mode (to progress mode, for example). The acceleration behavior that occurs while a key is held down also takes into account the relation of the current playback position to the beginning and end of the track. More specifically, as the playback position approaches the end of the track when fast-forwarding or the beginning of the track when rewinding, the rate of acceleration automatically decreases so as to allow for more precise positioning and to avoid overshooting the end or beginning of the track.

Figure 28:
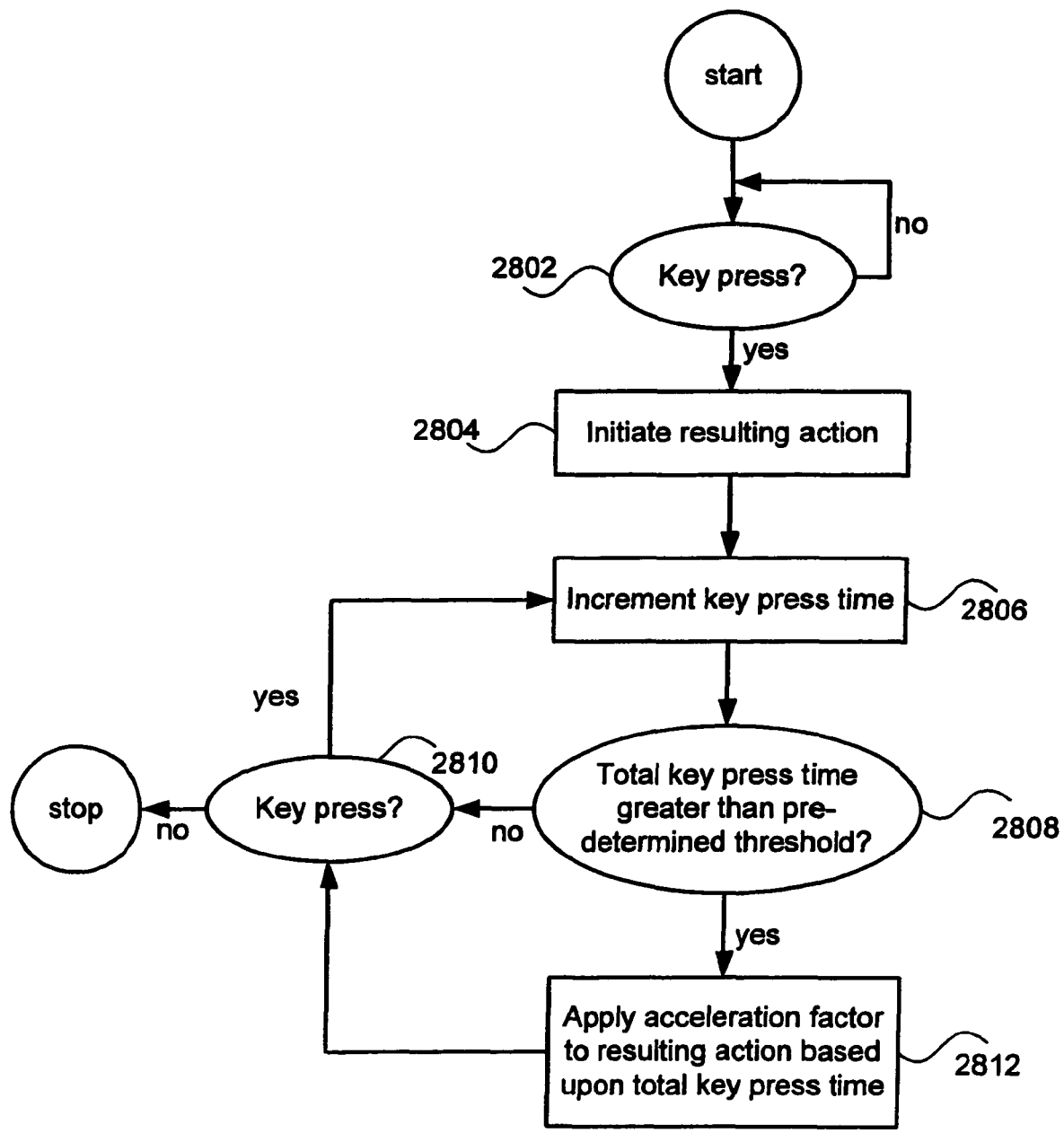
FIG. 28 illustrates a flowchart detailing a process describing an accelerated resulting action in accordance with an embodiment of the invention.

FIG. 28 illustrates a flowchart detailing a process 2800 describing an accelerated resulting action in accordance with an embodiment of the invention. The process 2800 begins at 2802 by determining if a key press has occurred. When a key press has occurred, then at 2804, a corresponding resulting action is initiated while at 2806 the key press time is incremented (such as 5 seconds). At 2808, the total key press time (i.e., the total length of time that the key in question has been held down) is compared to a pre-determined threshold length of time. If the total length of key press time is less than the pre-determined threshold, then a determination is made at 2810 if the key press is still ongoing. If the key press is still ongoing, then control is passed back to 2806 where the key press time is incremented, otherwise, the process 2800 stops. On the other hand, if at 2808 it had been determined that the total key press time is greater than the pre-determined threshold length of time, then at 2812, an acceleration factor is applied to the resulting action where the applied acceleration depends upon the total key press time. In some embodiments, after a period of time, the mode switches to another mode (to progress mode, for example).

Figure 29A:
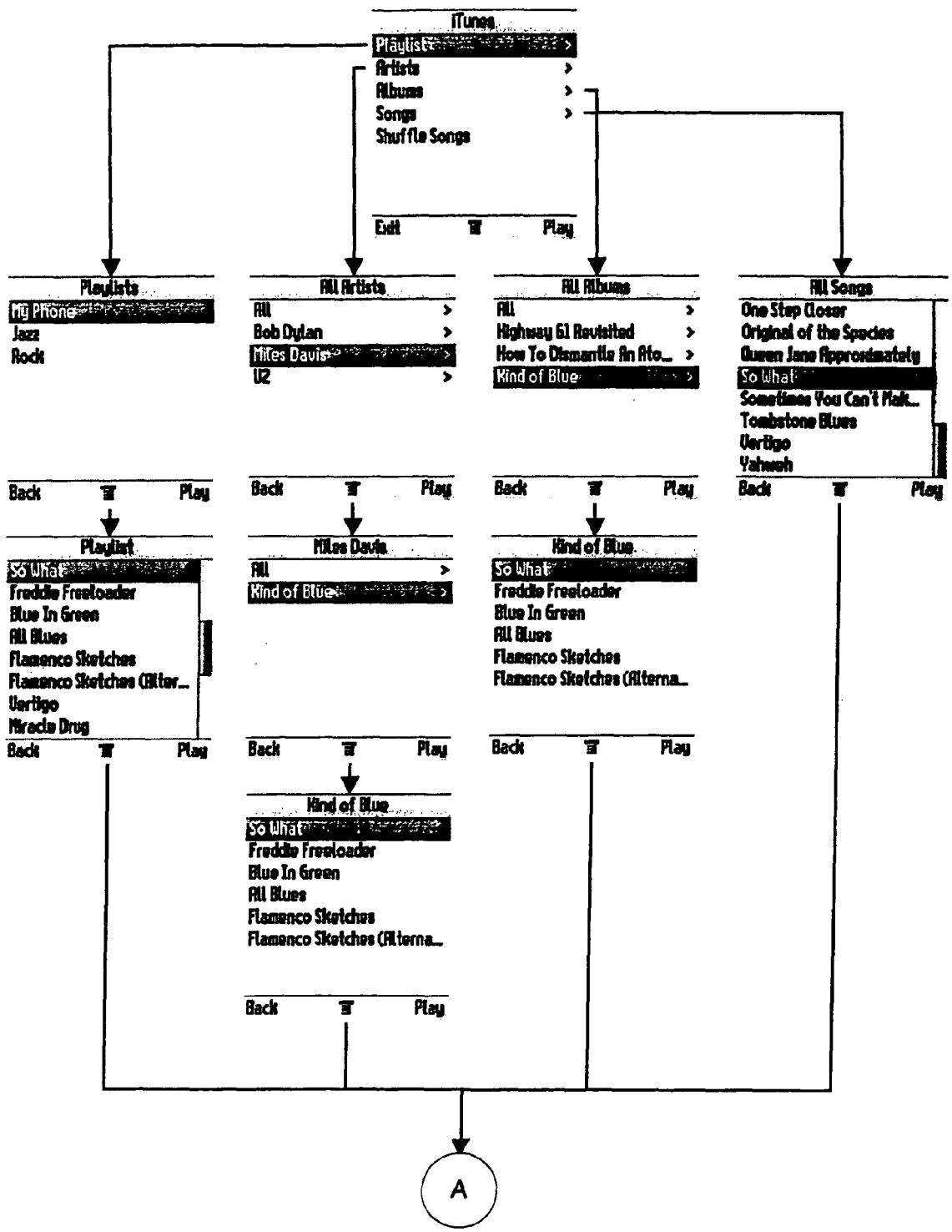
FIGS. 29A, B-30 shows exemplary screen flows in accordance with an embodiment of the invention.
Figure 29B:
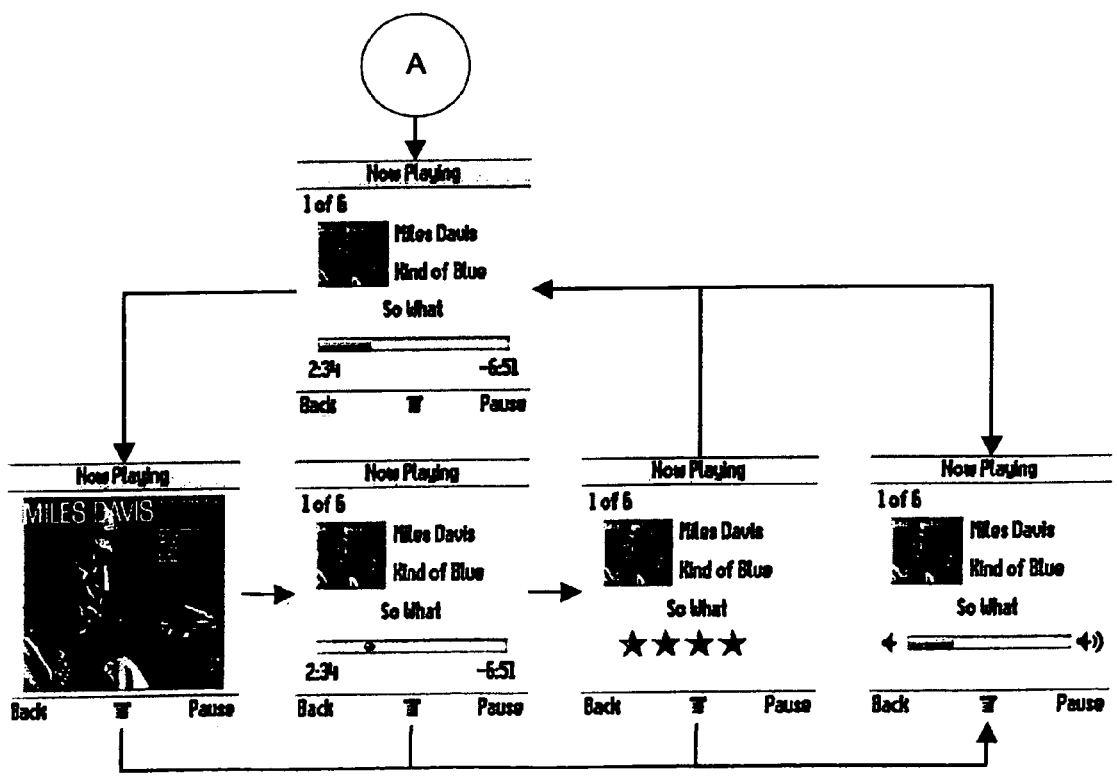
Figure 30:
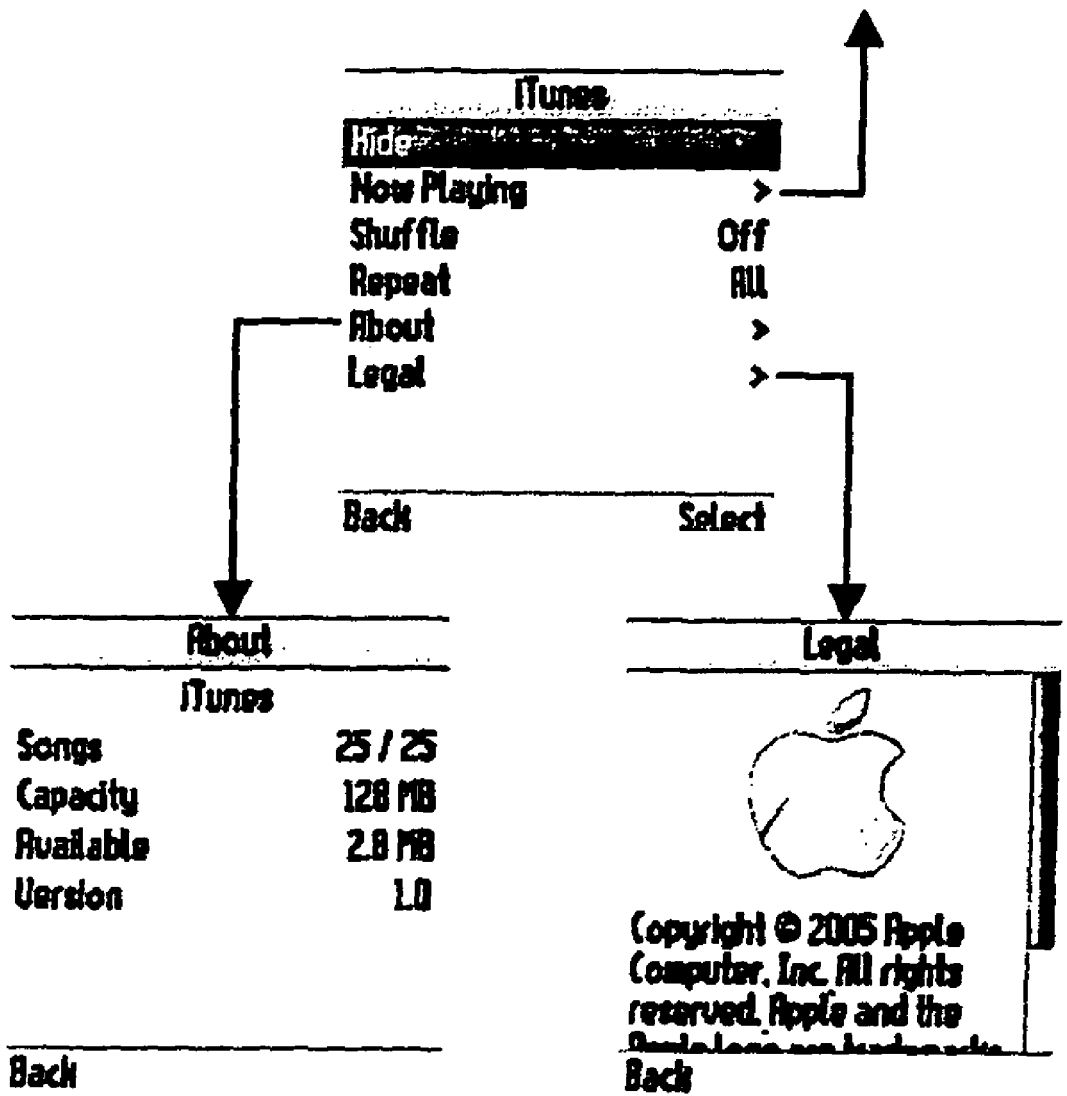

FIGS. 29A, B-30 shows exemplary screen flows in accordance with an embodiment of the invention. FIGS. 29A,B shows an exemplary main menu screen flows whereas FIG. 30 shows a contextual menu flow.

FIGS. 31-63 show operational tables for each of the above described menu screens for list items, soft keys, and hard keys in accordance with an embodiment of the invention.

FIG. 31 is a list item operational table for the main menu screen in accordance with an embodiment of the invention.

FIG. 32 is a soft key operational table for the main menu screen in accordance with an embodiment of the invention.

FIG. 33 is a hard key operational table for the main menu screen in accordance with an embodiment of the invention.

FIG. 34 is a list item operational table for the playlist screen in accordance with an embodiment of the invention.

FIG. 35 is a soft key operational table for the playlist screen in accordance with an embodiment of the invention.

FIG. 36 is a hard key operational table for the playlist screen in accordance with an embodiment of the invention.

FIG. 37 is a list item operational table for the playlists screen in accordance with an embodiment of the invention.

FIG. 38 is a soft key operational table for the playlists screen in accordance with an embodiment of the invention.

FIG. 39 is a hard key operational table for the playlists screen in accordance with an embodiment of the invention.

FIG. 40 is a list item operational table for the artists screen in accordance with an embodiment of the invention.

FIG. 41 is a soft key operational table for the artists screen in accordance with an embodiment of the invention.

FIG. 42 is a hard key operational table for the artists screen in accordance with an embodiment of the invention.

FIG. 43 is a list item operational table for the albums screen in accordance with an embodiment of the invention.

FIG. 44 is a soft key operational table for the albums screen in accordance with an embodiment of the invention.

FIG. 45 is a hard key operational table for the albums screen in accordance with an embodiment of the invention.

FIG. 46 is a list item operational table for the songs screen in accordance with an embodiment of the invention.

FIG. 47 is a soft key operational table for the songs screen in accordance with an embodiment of the invention.

FIG. 48 is a hard key operational table for the songs screen in accordance with an embodiment of the invention.

FIG. 49 is a repeat indicator and shuffle indicator operational table for the now playing screen in accordance with an embodiment of the invention.

FIG. 50 is a soft key operational table for the now playing screen in accordance with an embodiment of the invention.

FIG. 51A-51D are hard key operational tables for the now playing screen in accordance with an embodiment of the invention.

FIG. 52 is a list item operational table for the contextual menu screen in accordance with an embodiment of the invention.

FIG. 53 is a soft key operational table for the contextual menu screen in accordance with an embodiment of the invention.

FIG. 54 is a hard key operational table for the contextual menu screen in accordance with an embodiment of the invention.

FIG. 55 is a list item operational table for the about screen in accordance with an embodiment of the invention.

FIG. 56 is a soft key operational table for the about screen in accordance with an embodiment of the invention.

FIG. 57 is a hard key operational table for the about screen in accordance with an embodiment of the invention.

FIG. 58 is a soft key operational table for the legal screen in accordance with an embodiment of the invention.

FIG. 59 is a hard key operational table for the legal screen in accordance with an embodiment of the invention.

FIG. 60 is a list item operational table for the delete menu screen in accordance with an embodiment of the invention.

FIG. 61 is a soft key operational table for the delete menu screen in accordance with an embodiment of the invention.

FIG. 62 is a hard key operational table for the delete menu screen in accordance with an embodiment of the invention.

FIG. 63 is a list item operational table for the delete artists screen in accordance with an embodiment of the invention.

FIG. 64 is a soft key operational table for the delete artists screen in accordance with an embodiment of the invention.

FIG. 65 is a hard key operational table for the delete artists screen in accordance with an embodiment of the invention.

FIG. 66 is a list item operational table for the delete albums screen in accordance with an embodiment of the invention.

FIG. 67 is a soft key operational table for the delete albums screen in accordance with an embodiment of the invention.

FIG. 68 is a hard key operational table for the delete albums screen in accordance with an embodiment of the invention.

FIG. 69 is a list item operational table for the delete songs screen in accordance with an embodiment of the invention.

FIG. 70 is a soft key operational table for the delete songs screen in accordance with an embodiment of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of assisting a user interacting with a portable wireless communication device having a display and a plurality of user input devices, comprising:
    providing a user interface for the portable wireless communication device, the user interface including a plurality of linked display screens;
    displaying one of the linked display screens on the display as a current display screen;
    determining an occurrence of a user input comprising pressing a selected user input device;
    displaying a resulting action associated with the user input on a next display screen based upon the current displayed screen and a most recently displayed previous display screen, wherein the resulting action comprises fast-forwarding or rewinding a playback position with respect to a selected track;
    comparing total press time of the selected user input device to a first value;
    applying an acceleration factor dependant on total press time to the resulting action when total press time exceeds the first value; and
    automatically decreasing the acceleration factor applied to the resulting action when the playback position approaches but has not yet reached an end of the track or a beginning of the track.

2. A method as recited in claim 1, further comprising displaying a plurality of user selectable items on the current display screen.

3. A method as recited in claim 2, wherein the plurality of user input devices includes a plurality of navigation keys arranged to provide a navigation signal used to navigate amongst the selectable items being displayed.

4. A method as recited in claim 3, wherein the plurality of user input devices includes a plurality of keypad keys arranged to provide a keypad input signal.

5. A method as recited in claim 4, wherein the portable wireless communication device is selected from a group that includes a cell phone, a personal digital assistant (PDA), and a digital multimedia player.

6. A method as recited in claim 5, wherein the keypad input signals are suitable for initiating a communication session by the portable wireless communication device.

7. A method as recited in claim 6, wherein the portable wireless communication device includes a memory device, and the method further comprises:
    receiving a key press at a particular one of the keypad keys being configured to initiate a digital data file download operation;
    downloading the digital data file in response to the key press of the particular one of the keypad keys; and
    storing the digital data file in the memory device.

8. A method as recited in claim 7, wherein the digital data file is a digital audio file.

9. A method as recited in claim 7, wherein the downloaded digital audio file is incorporated into a library of digital audio files stored in the memory device.

10. A method as recited in claim 9, wherein the plurality of linked display screens includes a main menu screen that is a home screen of the graphical user interface from which a user can view and interact with, at least, a selectable master playlist item, a selectable list of artist items, a selectable list of all album items, and a selectable list of song items corresponding to the digital audio files stored in the memory device.

11. A method as recited in claim 10, further comprising:
    receiving a user selection of the master playlist item; and
    displaying a playlists screen that lists selectable items corresponding to the names of all the playlists that have been stored in the memory device.

12. A method as recited in claim 11, further comprising:
    receiving a user selection of one of the items of the playlists screen corresponding to a selected playlist; and
    displaying a selected playlist screen corresponding to the selected playlist that includes a list of selectable items corresponding to the names of the songs in the selected playlist in the order in which they will be played.

13. A method as recited in claim 12, wherein the user can arrange the order of the songs in the selected playlist as desired.

14. A method as recited in claim 13, further comprising:
    receiving a user selection of one of the items of the selected playlist corresponding to a selected song; and
    displaying a now playing screen associated with the selected song.

15. A method as recited in claim 10, further comprising:
receiving a user selection of one of the selectable artist items; and
displaying an all artists screen that lists selectable items corresponding to the names of all the artists that have been stored in the memory device.

16. A method as recited in claim 15, further comprising:
receiving a user selection of one of the items of the all artists screen corresponding to a selected artist; and
displaying an artist screen corresponding to the selected artist that includes a list of selectable items corresponding to the names of the songs stored in the memory device that correspond to the selected artist.

17. A method as recited in claim 16, wherein user can arrange the order of the songs in the artists screen as desired.

18. A method as recited in claim 17, further comprising:
receiving a user selection of one of the items of the artist screen corresponding to a selected song; and
displaying a now playing screen associated with the selected song.

19. A method as recited in claim 10, further comprising:
receiving a user selection of one of the all albums items; and
displaying an album screen that lists selectable items corresponding to the names of all the albums stored in the memory device.

20. A method as recited in claim 19, further comprising:
receiving a user selection of one of the items of the albums screen corresponding to a selected album; and
displaying a selected album screen corresponding to the selected album that includes a list of selectable items corresponding to the names of the songs in the selected album in the order in which they will be played.

21. A method as recited in claim 20, wherein the user can arrange the order of the songs in the selected album screen as desired.

22. A method as recited in claim 21, further comprising:
receiving a user selection of one of the items of the selected album screen corresponding to a selected song; and
displaying a now playing screen associated with the selected song.

23. A method as recited in claim 20, further comprising:
receiving a user selection of one of the selectable items in the selected album screen corresponding to a selected album; and
displaying a songs screen that lists selectable items corresponding to the names of all the songs stored in the memory device that correspond to the selected album.

24. A method as recited in claim 23, further comprising:
receiving a user selection of one of the items of the songs screen corresponding to a selected song; and
displaying a now playing screen associated with the selected song.

25. A method as recited in claim 1, wherein the acceleration factor increases as total press time increases.

26. A method as recited in claim 1, wherein the resulting action includes displaying a position indicator associated with the playback position.

27. A method as recited in claim 1, further comprising comparing total press time to a second value and changing the resulting action from a first mode to a second mode when total press time exceeds the second value.

28. A portable handheld device, comprising:
a display configured to display a user interface including a plurality of linked display screens;
multiple keys; and
a processor configured to determine an occurrence of a user input comprising pressing a selected key of the multiple keys and compare total press time of the selected key to a first value,
wherein the display is further configured to display a resulting action associated with the user input on a display screen, the resulting action comprising fast-forwarding or rewinding a playback position with respect to a selected track, and
wherein the processor is further configured to (i) apply an acceleration factor dependant on total press time to the resulting action when total press time exceeds the first value and (ii) automatically decrease the acceleration factor applied to the resulting action when the playback position approaches but has not yet reached an end of the track or a beginning of the track.

29. A device as recited in claim 28, wherein the acceleration factor increases as total press time increases.

30. A device as recited in claim 28, wherein the resulting action includes displaying a position indicator associated with the playback position.

31. A device as recited in claim 28, further comprising comparing total press time to a second value and changing the resulting action from a first mode to a second mode when total press time exceeds the second value.

32. A method of assisting a user interacting with a device, comprising:
displaying a display screen having an indicator moving along a track at a first rate;
determining an occurrence of a user input comprising actuating a user input device;
displaying a resulting action associated with the user input, the resulting action comprising moving the indicator along the track at a second rate greater than the first rate;
comparing total press time of the user input device to a value;
applying an acceleration factor dependant on total press time to the second rate when total press time exceeds the value; and
automatically decreasing the acceleration factor applied to the second rate when the indicator approaches but has not yet reached an end of the track or a beginning of the track.

* * * * *